United States Patent
Matsuo et al.

(10) Patent No.: US 8,330,862 B2
(45) Date of Patent: Dec. 11, 2012

(54) DEVICE LINKAGE APPARATUS AND DEVICE LINKAGE METHOD

(75) Inventors: Keisuke Matsuo, Nara (JP); Takakazu Shiomi, Osaka (JP)

(73) Assignee: Panasonic Corporation, Osaka (JP)

( * ) Notice: Subject to any disclaimer, the term of this patent is extended or adjusted under 35 U.S.C. 154(b) by 1210 days.

(21) Appl. No.: 12/158,250

(22) PCT Filed: Dec. 19, 2006

(86) PCT No.: PCT/JP2006/325281
§ 371 (c)(1),
(2), (4) Date: Jun. 19, 2008

(87) PCT Pub. No.: WO2007/072821
PCT Pub. Date: Jun. 28, 2007

(65) Prior Publication Data
US 2009/0174821 A1    Jul. 9, 2009

(30) Foreign Application Priority Data
Dec. 20, 2005    (JP) .................................. 2005-367001

(51) Int. Cl.
H04N 7/00    (2011.01)
H04N 1/00    (2006.01)
H04N 5/44    (2011.01)
(52) U.S. Cl. ............. 348/552; 348/553; 348/705; 710/2; 710/3; 710/5; 710/15
(58) Field of Classification Search .......... 348/552–558, 348/705, 706; 340/4.3–4.4; 710/2, 3, 5, 710/10, 15
See application file for complete search history.

(56) References Cited

U.S. PATENT DOCUMENTS

| | | | |
|---|---|---|---|
| 7,135,985 B2 * | 11/2006 | Woolgar et al. | 340/4.3 |
| 7,499,462 B2 * | 3/2009 | MacMullan et al. | 370/401 |
| 2005/0120383 A1 * | 6/2005 | Ozaki et al. | 725/131 |
| 2005/0165967 A1 | 7/2005 | Woolgar | |
| 2005/0168658 A1 | 8/2005 | Woolgar et al. | |
| 2006/0095596 A1 | 5/2006 | Yung et al. | |

FOREIGN PATENT DOCUMENTS

| | | |
|---|---|---|
| JP | 5-153520 | 6/1993 |
| JP | 2005-522903 | 7/2005 |
| JP | 2005-524926 | 8/2005 |
| JP | 2006-135959 | 5/2006 |
| WO | 03/085618 | 10/2003 |
| WO | 03/096695 | 11/2003 |

OTHER PUBLICATIONS

International Search Report issued Apr. 17, 2007 in the International (PCT) Application of which the present application is the U.S. National Stage.
High-Definition Multimedia Interface, Specification Version 1.2a, Dec. 14, 2005.

* cited by examiner

*Primary Examiner* — Michael Lee
(74) *Attorney, Agent, or Firm* — Wenderoth, Lind & Ponack, LLP.

(57) ABSTRACT

An STB (104), which reduces operating load of a user and causes a television (101) and an amplifier (102) to be appropriately linked, includes: a receiving unit (204) which receives a broadcast signal including an application program written in Java (registered trademark); a Java VM (403) which executes the application program; a CEC (401*b*4) which performs HDMI-CEC-compliant communication between each of the television (101) and the amplifier (102); and a device control library (405*e*) which performs conversion between data handled by an application program and data communicated by the CEC (401*b*4), so that the television (101) and the amplifier (102) can be controlled by the application program executed by the Java VM (403).

12 Claims, 30 Drawing Sheets

```
(1)   public HDMIDevice[] getDevices()
(2)   public int getPhysicalDeviceNumber()
(3)   public int getLogicalDeviceNumber()
```

```
(1)   public boolean AllDevicePowerOn()
(2)   Public boolean DevicePowerOn(HDMIDevice d)
(3)   public boolean AllDevicePowerOff()
(4)   Public boolean DevicePowerOff(HDMIDevice d)
```

FIG. 21

(1) public boolean HomeTheaterON()
(2) public boolean HomeTheaterOFF()
(3) public boolean setPlayMode (int mode)
(4) public boolean setSoundMode (int mode)

FIG. 22

(1) public boolean send(byte[] data)
(2) public boolean send(HDMIDevice d, byte[] data)

FIG. 23

(1) public void addListener(HDMIListener 1)
(2) public byre[] receive()
(3) public void addListener(byte condition,
                              HDMIListener 1)

public boolean IsHomeTheater()

FIG. 27

```
public class HDMIDevice {
      private int padd; /* physical address */
      private int ladd; /* logical address */
      public int getPhysicalDeviceNumber();
      public int getLogicalDeviceNumber();
       public boolean send(byte[] data);
      public void addListener(HDMIListener 1)
      public void removeListener(HDMIListener 1)
}

Public interface HDMIListener {
      public byte[] receive();
}
```

DEVICE LINKAGE APPARATUS AND DEVICE LINKAGE METHOD

1. TECHNICAL FIELD

The present invention relates to a device linkage apparatus which controls linkage of devices such as a television and an amplifier.

2. BACKGROUND ART

In recent years, there has been a full-fledged proliferation, in households, of home theater systems that combine a set top box (hereafter called STB) which receives a digital broadcast or a cable television (hereafter called CATV) broadcast, a television, a speaker, and a Digital Versatile Disk (DVD) player. With these devices, it is possible to implement the reproduction of mufti-channel audio, for example 5.1 channel audio, by setting the respective devices with the use of a remote control (see Non-Patent Reference 1).

There is proposed a technique (device linkage apparatus) for switching between outputting audio only from a television reception apparatus and outputting the audio from a speaker connected to an amplifier, in linkage with the ON/OFF operation of the power switch of the amplifier (see for example Patent Reference 1)

For example, the device linkage apparatus in the below-mentioned Patent Reference 1 is included in an AV amplifier that is capable of configuring a surround system by being combined with a television reception apparatus. In other words, the device linkage apparatus in the aforementioned Patent Reference 1 can perform switching between the use of the surround system and the independent use of the television reception apparatus.

FIG. 1 shows a block diagram of the AV amplifier in the below-mentioned Patent Reference 1.

With such a device linkage apparatus in an AV amplifier 40, when a power switch 41 of the AV amplifier 40 is turned ON during use of the surround system, a change-over switch 50 is switched to a center audio amplification circuit 48. As a result, an audio signal supplied to an audio input terminal 43 from a reproduction device such as a Video Tape Recorder (VTR) or a Laser Disc (LD), for example, or a television reception apparatus connected to the AV amplifier 40 is supplied to surrounding speakers, via a DSP 45 and through an audio output terminal 49. With such a device linkage apparatus in the AV amplifier 40, when the power switch 41 of the AV amplifier 40 is turned OFF during independent use of the television reception apparatus, the change-over switch 50 is switched to a television audio input terminal 51. As a result, television audio processed in the amplification circuit of the television reception apparatus is supplied to a speaker of the television reception apparatus, via the AV amplifier 40.

Non-Patent Reference 1: High Definition Multimedia Interface specification Version 1.2

Patent Reference 1: Japanese Unexamined Patent Application Publication No. 5-153520

However, with the device linkage apparatus in Patent Reference 1, there is the problem of having to take the trouble of operating the power to the AV amplifier in order to switch between the use and non-use of the surround system. In other words, a user needs to turn ON the power to the AV amplifier when causing a speaker connected to the AV amplifier 40 to output audio, and needs to turn OFF the power to the AV amplifier when causing a speaker included in the television reception apparatus to output the audio, other than the speaker connected to the AV amplifier.

Thus, the present invention is conceived in view of the aforementioned problem and has as an object to provide a device linkage apparatus which reduces the operating load of the user and causes devices to be linked appropriately.

SUMMARY OF THE INVENTION

In order to achieve the aforementioned object, the device linkage apparatus according to the present invention is a device linkage apparatus which causes operations of devices to be linked with each other, the device linkage apparatus includes: a receiving unit which receives a broadcast signal including an application program; a program execution unit which executes the application program; a communication unit which performs communication between each of the devices, the communication complying with High Definition Multimedia Interface (HDMI)-Consumer Electronics Control (CEC); and a conversion unit which performs conversion between data handled by the application program and data communicated by the communication unit, so as to allow control of the devices by the application program executed by the program execution unit.

When the application program outputs control data for controlling the operation of any device among the devices, such control data is converted into an HDMI-CEC message to be communicated by the communication unit and transmitted to the device. Therefore, when the device is a device that is compliant to HDMI-CEC, the application program can output control data and freely control the device, without having to take HDMI-CEC into consideration. Here, in the case where the application program is a program written in Java™, for example, the program outputs the aforementioned control data by calling a method which is a Java API. Furthermore, since the HDMI-CEC message transmitted from any of the devices is converted into data that can be handled by the application program, the application program can receive a message from the device and use the message in controlling such device, without having to take HDMI-CEC into consideration. As a result, in the present invention, respective devices can be freely controlled by the application program, and thus it is possible to reduce the operating load of the user and cause devices to be appropriately linked.

Furthermore, it is also possible that: the conversion unit obtains binary data from the application program, and converts the binary data into a message compliant with the HDMI-CEC, and the communication unit transmits the message to any one among the devices. Alternatively, it is also possible that: the communication unit receives a message compliant with the HDMI-CEC, from any one among the devices, and the conversion unit converts the message received by the communication unit into binary data, and passes the binary data to the application program.

For example, hardware and/or software for implementing linked functions between devices such as a television and an amplifier, are shipped out by being built-into such devices in advance. Subsequently, improvements and changes are carried out on hardware and/or software, and a new device in which the changed hardware and/or software are built into is marketed. As a result, there arise cases where linked functions cannot be implemented between the newly marketed device and an existing device. In view of this, in the present invention, since conversion is performed between the binary data handled by the application program and the HDMI-CEC message communicated by the communication unit, it is possible to appropriately control the newly marketed device and cause the linking of the operations of the devices including the newly marketed device, by merely replacing the application program to be executed, for example, without having to after the device linkage apparatus itself.

Furthermore, it is also possible that: the application program is a program written in Java (registered trademark), and the conversion unit registers a listener by accepting a registration request for the listener from the application program, and passes the binary data to the application program by calling a method of the listener.

With this, the application program can definitely receive the message from a device through binary data.

Furthermore, it is also possible that: the conversion unit further removes the registered listener by accepting a removal request for the listener from the application program.

With this, the application program can reject the reception of a message from a device.

Furthermore, it is also possible that: the devices include a first device which outputs video and audio and a second device which outputs audio, the conversion unit: obtains, from the application program, data instructing the first device to suppress audio output and to output video, and the second device to output audio; and converts the data into a message compliant with the HDMI-CEC, and the communication unit sends the message to the first and second devices.

With this, when the application program instructs the theater mode, for example, in which the first device such as a television outputs only video and the speaker of the second device such as an amplifier outputs audio, the television and the amplifier can properly receive the instruction and, as a result, it is possible to reduce the operating load of the user and cause the television and the amplifier to be linked appropriately in such a way as to output audio in the theater mode.

Furthermore, it is also possible that: the device linkage apparatus further includes a notification unit which judges whether or not the first and second devices are connected to the communication unit so as to allow communication with the communication unit, and notifies the application program of a result of the judgment.

With this, the application program can recognize whether or not the first and second devices are connected to the communication unit and, as a result, the application program can notify the user that the audio output state can be set to the theater mode when the first and second devices are connected, and skip an instruction for the theater mode when the first and second devices are not connected, and thus the level of freedom for processing by the application program can be raised.

Furthermore, it is also possible that: the conversion unit: obtains, from the application program, data instructing the second device to output audio in any one of mono, stereo, and 5.1 channel states; and converts the data into a message compliant with the HDMI-CEC, and the communication unit sends the message to the second device.

With this, when the application program instructs any of the reproduction modes such as mono, stereo, and 5.1 channel, the amplifier can properly receive the instruction and, as a result, it is possible to reduce the operating load of the user and appropriately operate the amplifier in such a way that audio is outputted in the specified reproduction mode.

Furthermore, it is also possible that: when data instructing an acoustic field for the audio to be outputted by the second device is received from the application program, the conversion unit converts the data into a message compliant with the HDMI-CEC, and the communication unit sends the message to the second device.

With this, when the application program instructs an acoustic field mode such as cinema mode or sports mode, for example, the amplifier can properly receive the instruction and, as a result, it is possible to reduce the operating load of the user and appropriately operate the amplifier in such a way that audio is outputted in the specified acoustic field mode.

Note that the present invention can be implemented, not only as such a device linkage apparatus, but also as a method and program thereof, a recording medium on which the program is stored, and an integrated circuit.

The device linkage apparatus in the present invention produces the effect of reducing the operating load of a user and causing devices to be linked appropriately.

BRIEF DESCRIPTION OF THE DRAWINGS

FIG. 21 is a diagram showing an example of Java APIs included in the acoustic field control unit according to the embodiment of the present invention.

FIG. 22 is a diagram showing an example of Java APIs included in the low-level transmitting unit according to the embodiment of the present invention.

FIG. 23 is a diagram showing an example of Java APIs included in the low-level receiving unit according to the embodiment of the present invention.

FIG. 27 is a diagram showing an example of a Java class definition used in the device control library according to the embodiment of the present invention.

DETAILED DESCRIPTION OF THE INVENTION

Hereinafter, a device linkage apparatus according to an embodiment of the present invention shall be described with reference to the Drawings.

Figure 1:
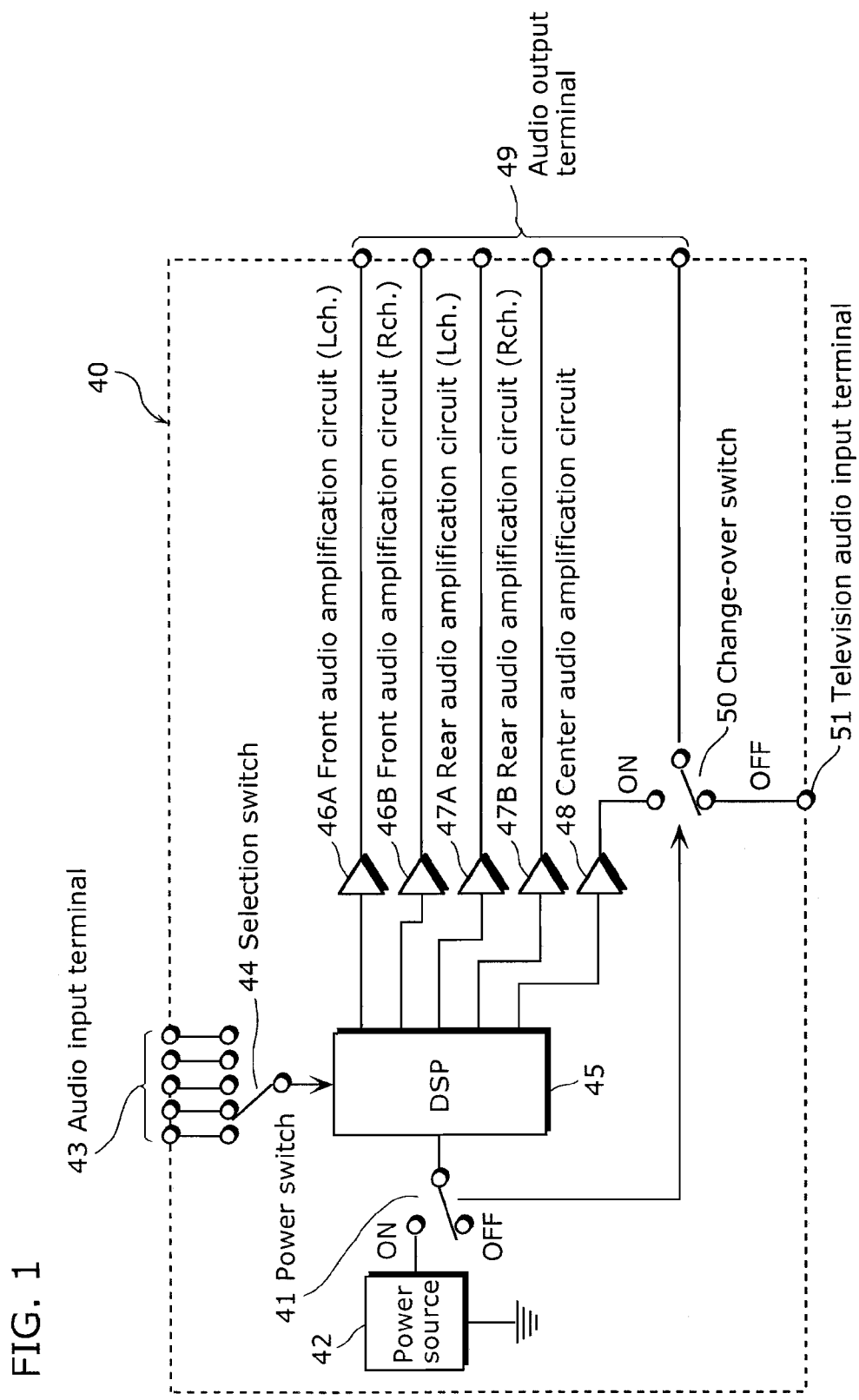
FIG. 1 is a configuration diagram of a conventional amplifier.
Figure 2A:
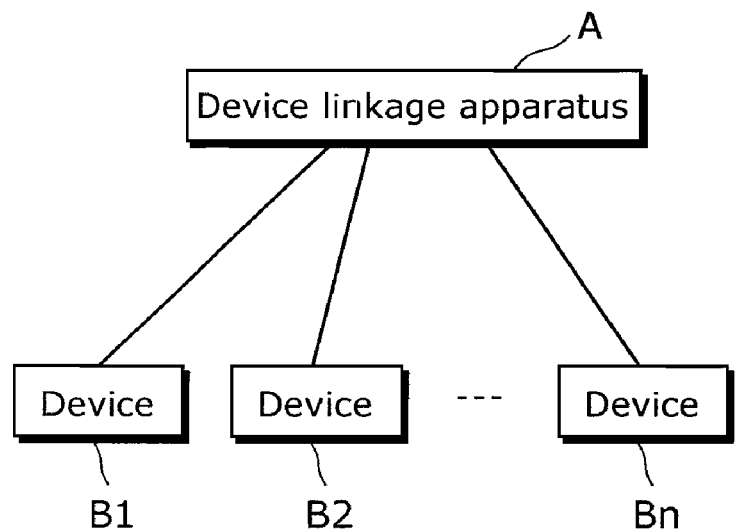
FIG. 2A is a configuration diagram showing the configuration of a system including a device linkage apparatus according to the embodiment of the present invention.

FIG. 2A is a configuration diagram showing the configuration of a system including the device linkage apparatus in the present embodiment.

The system includes a device linkage apparatus A in the present embodiment and n devices B1, B2, . . . , Bn. The device linkage apparatus A reduces the operating load of the user and causes the operations of the devices B1, B2, . . . , Bn to be linked appropriately. In other words, through the control of the devices B1, B2, . . . , Bn by the device linkage apparatus A in the present embodiment, the devices B1, B2, . . . , Bn execute linked processing.

For example, the device linkage apparatus A in the present embodiment is configured as a set top box (STB) which receives CATV, and causes the linking of a television, amplifier, and the like, as the aforementioned devices. A home theater system is configured from such an STB, television, amplifier, and speaker.

Figure 2B:
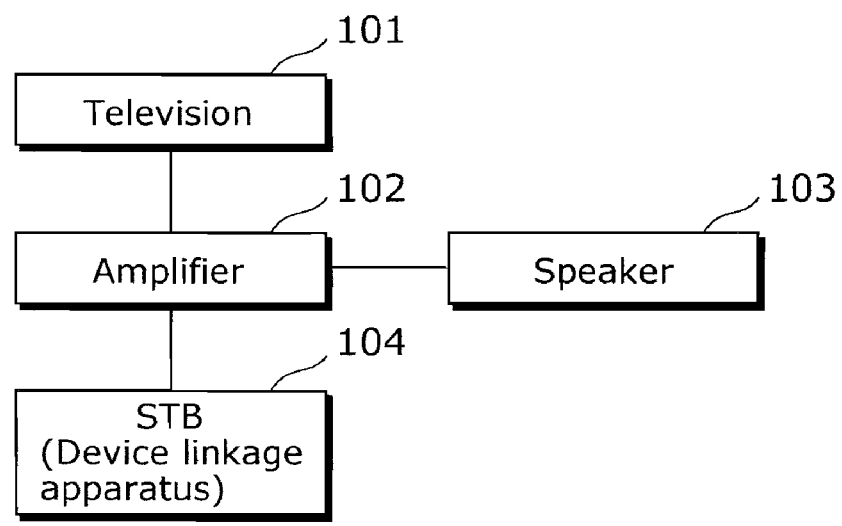
FIG. 2B is a configuration diagram of a home theater system according to the embodiment of the present invention.

FIG. 2B is a block diagram showing the configuration of a home theater system according to the present embodiment.

As shown in FIG. 2B, the home theater system includes a television 101, an amplifier 102, a speaker 103, and an STB 104. The STB 104, the television 101, and the amplifier 102 in the present embodiment respectively hold a High Definition Multimedia Interface (HDMI)-Consumer Electronics Control (CEC) communication unit which transmits and receives an HDMI-CEC command, and, by using an HDMI-CEC message which is the command, an application program received by the STB 104 automatically controls the audio output state, and so on.

Furthermore, in the present embodiment, the communication basic functions between devices such as the STB 104, the television 101, and the amplifier 102 is implemented by using middleware, specifically, Java™ middleware. By implementing individual device linkage functions as a Java application program, the newest device linkage functions can be implemented at all times.

Note that details of the HDMI specification is described in High Definition Multimedia Interface specification Version 1.2, and the HDMI-CEC specification is defined in the appendix "supplemental 1 Consumer Electronics Control" of the same specification. The HDMI standard is a transmission standard for transmitting non-compressed digital data of video/audio between devices, and a single cable complying with the HDMI standard is used in the transmission. HDMI-CEC defines a specification for bi-directionally transmitting a device control command between devices via such cable (HDMI cable). As of November 2005, the HDMI specification can be obtained through downloading from www.hdmi.org.

The television 101 holds an HDMI input terminal and is connected to the amplifier 102 through an HDMI line. The television 101 can reproduce video/audio transmitted from the amplifier 102. Furthermore, the television 101 can receive an HDMI-CEC message (command) transmitted through the HDMI line, and perform processing corresponding to the received message (command).

Figure 3:
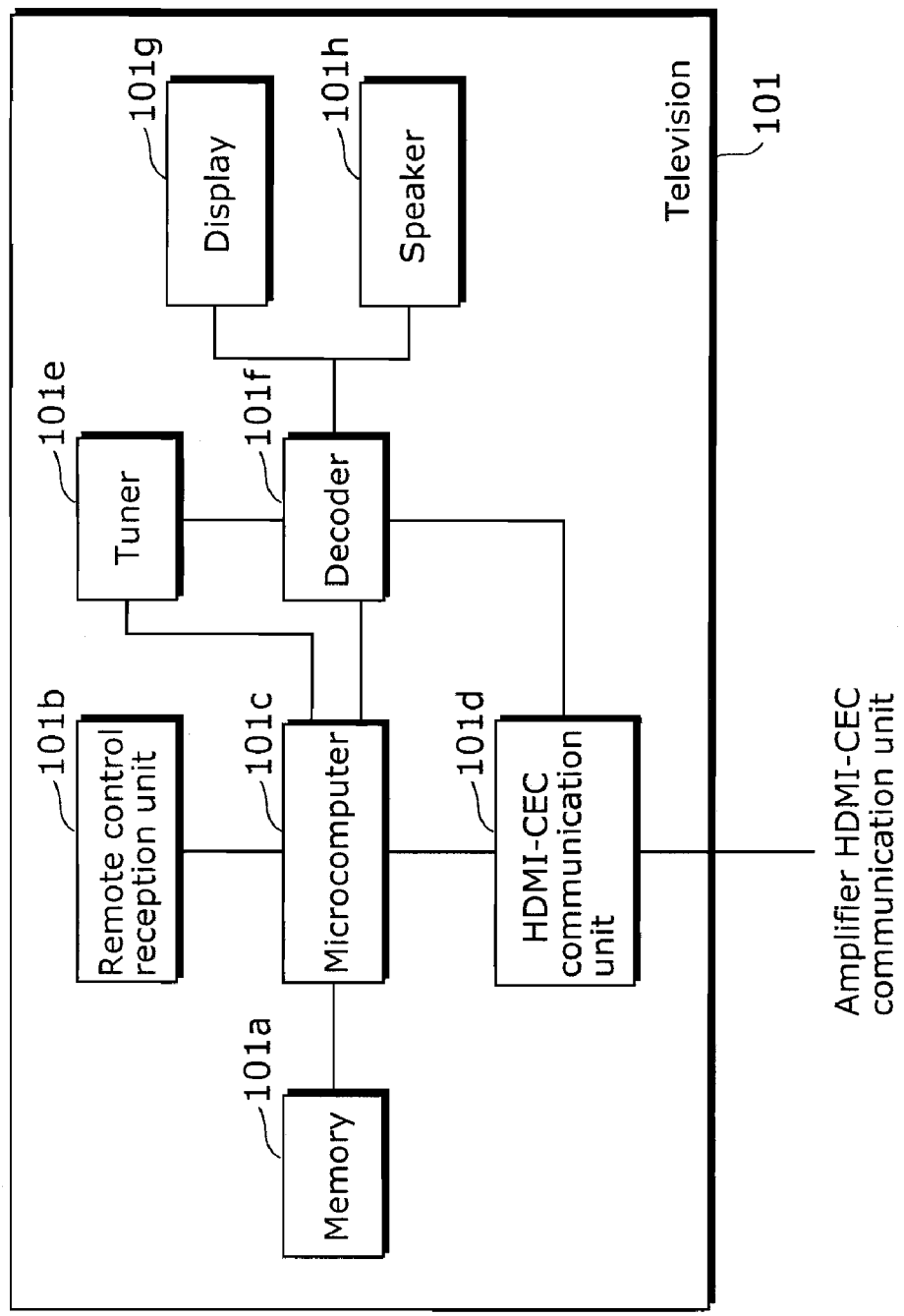
FIG. 3 is a configuration diagram showing the configuration of a television according to the embodiment of the present invention.

FIG. 3 is a configuration diagram showing the configuration of the television 101.

As shown in FIG. 3, the television 101 includes a memory 101a, a remote control reception unit 101b, a microcomputer 101c, an HDMI-CEC communication unit 101d, a tuner 101e, a decoder 101f, a display 101g, and a speaker 101h.

The television 101 may be operated by the user directly or by using a remote control device (not illustrated) (hereafter called television remote control).

When the remote control reception unit 101b receives a command sent from the television remote control, the microcomputer 101c performs processing according to the command, and controls the channel selection switching by the tuner 101e and the processing by the decoder 101f. The decoder 101f outputs the video and audio signals inputted from the tuner 101e and the HDMI-CEC communication unit 101d, to the display 101g and the speaker 101h according to the instruction by the microcomputer 101c. Furthermore, the microcomputer 101c performs respective settings or control according to an HDMI-CEC command inputted from the HDMI-CEC communication unit 101d.

Furthermore, the television 101 is equipped with an input unit (not illustrated) having buttons, and so on, in a front panel and the like. With the input from the input unit, the television 101 accepts operations that are the same as with the operation using the television remote control.

The amplifier 102 holds an HDMI input terminal and is connected to the television 101 and the STB 104 through an HDMI line. Furthermore, the amplifier 102 is connected to the speaker 103 through a line for the speaker. The amplifier 102 receives video/audio from the STB 104. The amplifier 102 transmits the received video/audio to the television 101. Furthermore, in the case where a predetermined acoustic field mode, such as cinema mode, sports mode, music mode, drama mode, is set in the amplifier 102, the amplifier 102 adds, to the audio signal received from the STB 104, the acoustic field characteristics corresponding to such acoustic field mode, and transmits the audio signal to the speaker 103. Of course the amplifier 102 may transmit the audio signal without adding the acoustic field characteristics. Here, the addition of acoustic field characteristics is, more specifically, an audio signal processing based on: a reverberation characteristic parameter such as the magnitude and quantity of reflected audio, the magnitude of reverberant audio, and reverberation time; and a frequency characteristic parameter. The addition of acoustic field characteristics can be implemented using conventional techniques. Note that the acoustic field is the state and quality of audio outputted from the speaker 103, and is classified into the aforementioned cinema mode, sports mode, and so on, according to the magnitude and quantity of reflected audio, the magnitude of reverberant audio, reverberation time, and frequency characteristics.

The amplifier 102 can receive an HDMI-CEC message (command) transmitted through the HDMI line, and perform processing corresponding to the message (command). This processing also includes the aforementioned setting of the acoustic field mode.

Figure 4:
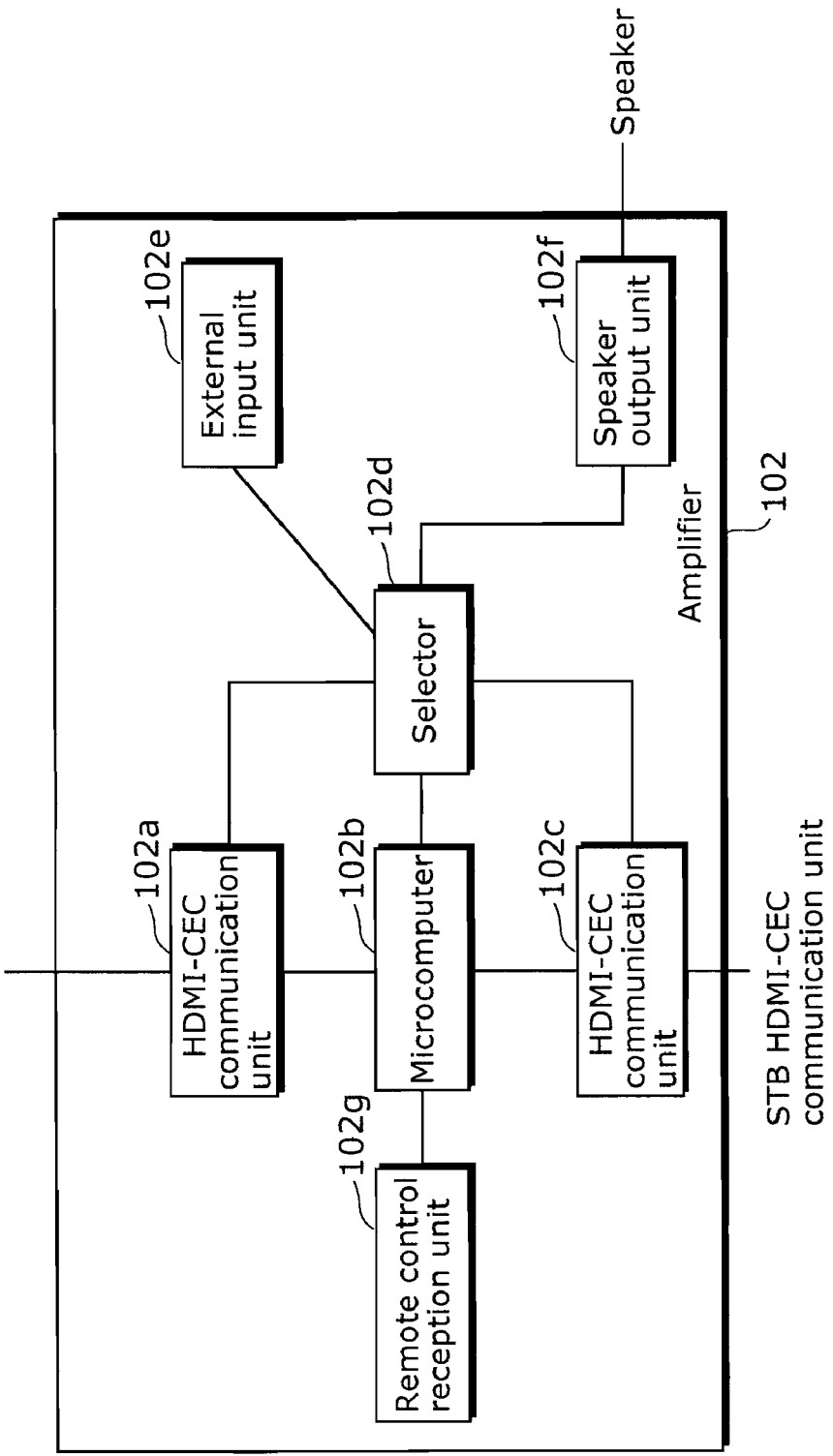
FIG. 4 is a configuration diagram showing the configuration of an amplifier according to the embodiment of the present invention.

FIG. 4 is a configuration diagram showing the configuration of the amplifier 102.

As shown in FIG. 4, the amplifier 102 includes an HDMI-CEC communication unit 102a, a microcomputer 102b, an HDMI-CEC communication unit 102c, a selector 102d, an external input unit 102e, a speaker output unit 102f, and a remote control reception unit 102g.

The amplifier 102 may be operated by the user directly or by using a remote control device (not illustrated) (hereafter called amplifier remote control).

When the remote control reception unit 102g receives a command sent from the amplifier remote control, the microcomputer 102b performs processing according to the command. Furthermore, the microcomputer 102b performs processing according to an HDMI-CEC command received by the HDMI-CEC communication unit 102a or the HDMI-CEC communication unit 102c.

In accordance with the instruction from the microcomputer 102b, the selector 102d switches between an audio signal to be outputted from the HDMI-CEC communication unit 102c and an audio signal to be outputted from the external input unit 102e, and outputs the audio signal that has been switched to, to the speaker output unit 102f. Here, the selector 102d outputs the audio signal to the speaker 103 in a form that conforms to the format (stereo audio format, 5.1 channel audio format, and so on) which is the acoustic characteristic added to the audio signal.

Furthermore, the amplifier 102 includes, in a front panel and the like, an input unit (not illustrated) having buttons, and so on. With the input from the input unit, the amplifier 102 accepts operations that are the same as the operations when the amplifier remote control is used.

The speaker 3 is an assembly of speakers which perform multi-channel audio reproduction, for example, 5.1 channel reproduction, in order to reproduce an acoustic effect having a sense of realism as in a movie theater. The speaker 103, in actuality, is configured of six speakers (not illustrated). In other words, the speaker 103 includes a bass output speaker, and 5 speakers arranged in a frontal, a right-front direction, a left-front direction, a right-rear direction, and a left-rear direction, with respect to the user. The speaker 103 receives an audio signal from the amplifier 102, and outputs audio.

The STB 104 performs the receiving/reproduction of a CATV broadcast. Furthermore, the STB 104 includes an HDMI terminal for outputting the reproduced video and audio.

Figure 5:
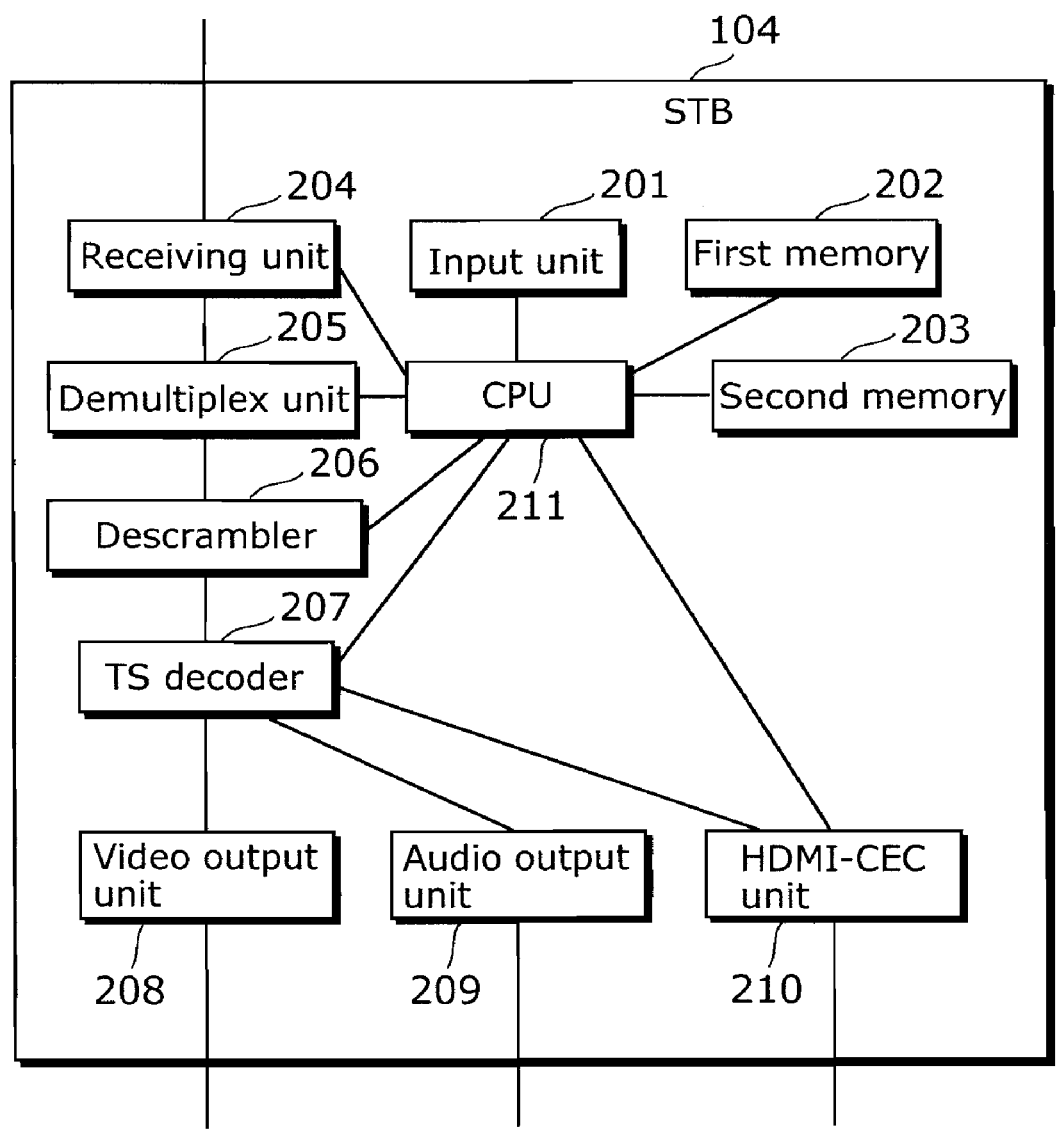
FIG. 5 is a configuration diagram of an STB according to the embodiment of the present invention.

FIG. 5 is a block diagram showing the configuration of the STB 104 in to the present embodiment.

The STB 4 includes an input unit 201, a first memory 202, a second memory 203, a receiving unit 204, a demultiplex unit 205, a descrambler 206, a TS decoder 207, a video output unit 208, an audio output unit 209, an HDMI unit 210, and a CPU 211.

The input unit 201 is configured of a front panel, remote control light receiver, and the like, and accepts an instruction such as a channel selection from a user, and the like.

Figure 6:
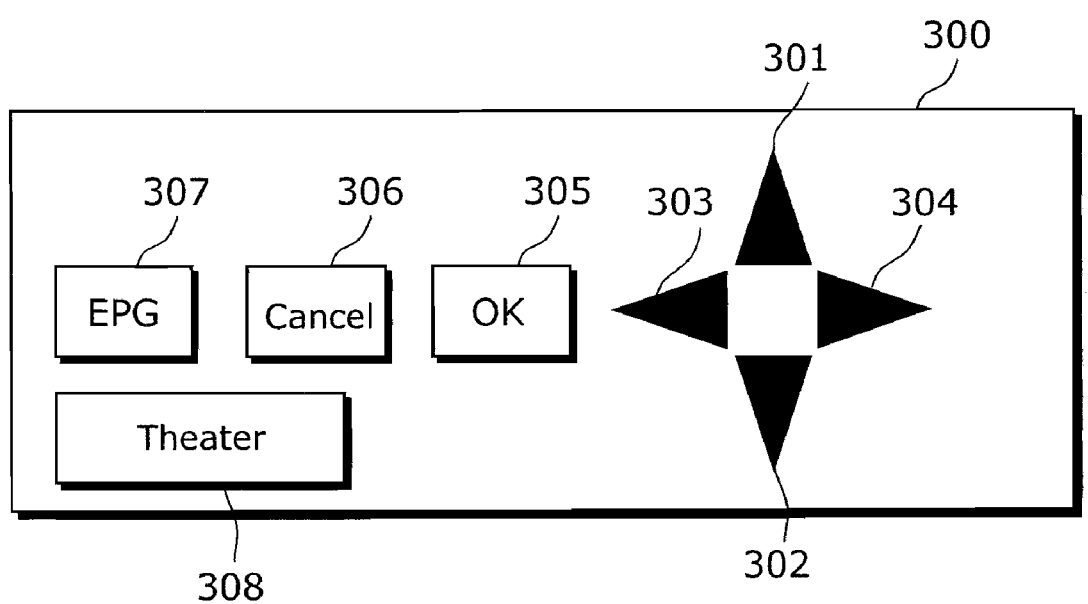
FIG. 6 is a diagram showing an example of the external view of a front panel configured as an input unit according to the embodiment of the present invention.

FIG. 6 is a diagram showing an example of a front panel configured as the input unit 201.

A front panel 300 includes of 8 buttons, namely, an up-cursor button 301, a down-cursor button 302, a left-cursor button 303, a right-cursor button 304, an OK button 305, a cancel button 306, an EPG button 307, and a theater button 308. When the user presses down a button, the identifier of such pressed button is notified to the CPU 211.

The first memory 202 is configured of a Random Access Memory (RAM) and the like, and is used when the microcomputer 211 temporarily stores data.

The second memory 203 is configured of a device that can hold information even when power is turned off, such as a flash memory, a hard disk, or the like, and stores a program executed by the CPU 211. The second memory 203 may also be configured as a detachable storage device such as a Secure Digital™ (SD) memory card and the like.

The receiving unit 204, which is connected to a cable from a cable television station, receives a broadcast signal, tunes to the frequency specified by the CPU 211, extracts an MPEG transport stream, and passes the extracted MPEG transport stream to the demultiplex unit 205.

The demultiplex unit 205 receives the MPEG transport stream from the receiving unit 204, extracts information specified by the CPU 211 from the MPEG transport stream, and passes the extracted information to the CPU 211. In addition, the demultiplex unit 205 passes the MPEG transport stream directly to the descrambler 206.

The descrambler 206 descrambles (decrypts) the scrambled MPEG transport stream provided by the demultiplex unit 205, and passes the result to the TS decoder 207. The descrambler 206 may be a module built-into the STB 104, and may also be implemented through the CableCARD™ introduced in North American cable receivers. The specifications of CableCARD are described in the CableCARD Interface Specification laid out by the CableLabs in the United States, and thus description is omitted herein.

The TS decoder 207 receives the identifiers of audio data and video data from the CPU 211. In addition, the TS decoder 207 extracts, from the descrambled stream received from the descrambler 206, audio data and video data corresponding to the received identifiers of the audio data and video data. Then, the TS decoder 207 passes the extracted video data to the video output unit 208, and the audio data to the audio output unit 209. Furthermore, the TS decoder 207 passes both (the video data and the audio data) to the HDMI unit 210.

The video output unit 208, which includes a video output terminal, converts the received video data into video data that complies with the video output terminal and outputs the converted video data. An example of the video output terminal is a composite cable terminal, and so on.

The audio output unit 209, which includes an audio output terminal, converts the received audio data into audio data that complies with the audio output terminal and outputs the converted audio data. Examples of the audio output terminal are earphone terminals, the composite cable terminal, and so on.

The HDMI unit 210, which includes an HDMI terminal, converts the received video data and audio data into a video and audio data format that is based on the HDMI specification and outputs the converted video data and audio data. Furthermore, upon receiving an instruction for HDMI-CEC message transmission from the CPU 211, the HDMI unit 210 converts a predetermined command into a data format that is based on the HDMI specification, then outputs the message. Furthermore, the HDMI unit 210 passes the HDMI-CEC message received through the HDMI terminal, to the CPU 211.

The CPU 211 controls the receiving unit 204, the demultiplex unit 205, the descrambler 206, the TS decoder 207, and the HDMI unit 210 by executing a program stored in the second memory 203.

Figure 7:
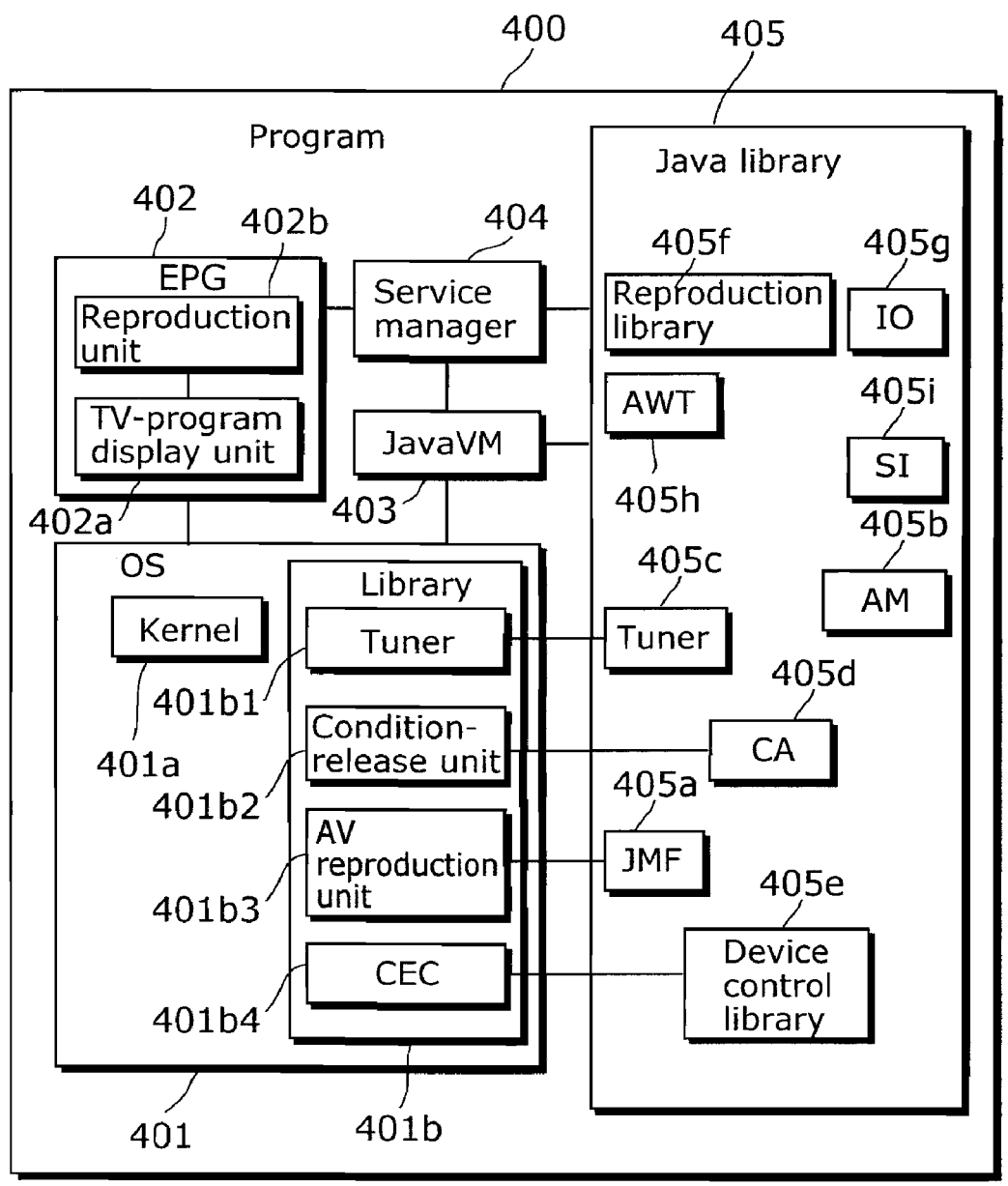
FIG. 7 is a configuration diagram of a program according to the embodiment of the present invention.

FIG. 7 is a structure diagram of the program stored in the second memory 203 and executed by the CPU 211.

A program 400 is made up of a plurality of subprograms and specifically includes an OS 401, an EPG 402, a Java VM 403, a service manager 404, and a Java library 405 (Java is a registered trademark).

The OS 401 is a subprogram for activating the CPU 211 when power to the STB 104 is turned on. The "OS" in OS 401 is an abbreviation of operating system, and the OS 401 is, for example, Linux and the like. Such an OS 401 includes a kernel 401a for executing a subprogram concurrently with another subprogram, and a library 401b. In the present embodiment, the kernel 401a of the OS 401 executes the EPG 402 and the Java VM 403 as subprograms. Furthermore, the library 401b provides these subprograms with plural functions required for controlling the constituent elements held by the STB 104.

In the present embodiment, the library 401b includes a tuner 401b1, a condition-release unit 401b2, a CEC 401b4, and an AV reproduction unit 401b3. The tuner 401b1 receives tuning information including a frequency from other subprograms or a Tuner 405c of the Java library 405, and passes the received tuning information to the receiving unit 204. The receiving unit 204 can perform demodulation based on the provided tuning information, and pass the demodulated data to the demultiplex unit 205. As a result, the other subprograms and the Tuner 405c of the Java library 405 can control the receiving unit 204 through the library 401b.

The CEC 401b4 receives required information from other programs and a device control library 405e of the Java library 405, and creates a message defined by HDMI-CEC. The CEC 401b4 transmits the HDMI-CEC message to other devices via the HDMI line, by passing the created message to the HDMI unit 210. Furthermore, the CEC 401b4 receives an HDMI-CEC message from the other devices via the HDMI line, and notifies the received message to the other subprograms or the device control library 405e of the Java library 405.

The AV reproduction 401b3 receives the packet ID of the audio data and the packet ID for the video data, from the other subprograms or a JMF 405a of the Java library 405. The AV reproduction 401b3 provides the received audio packet ID and video packet ID to the TS decoder 207. As a result, the TS decoder 207 performs filtering based on the provided packet IDs, and implements the reproduction of video and audio.

The EPG 402 includes a TV-program display unit 402a for displaying a list of television programs to the user as well as for accepting an input from the user, and a reproduction unit 402b for selecting channels. Here, EPG is an abbreviation of Electric Program Guide. The EPG 402 is activated by the kernel 401a when power to the STB 104 is turned on. Inside the activated EPG 402, the TV-program display unit 402a and the reproduction unit 402b are activated at the same time. When activated, the TV-program display unit 402a waits for an input from the user through the input unit 201 of the STB 104. Here, in the case where the input unit 201 is configured as the front panel 300 shown in FIG. 6, when the user presses down the EPG button 307 of the front panel 300, the identifier of the EPG button is notified to the CPU 211. Upon accepting the identifier, the TV-program display unit 402a of the EPG 402, which is a subprogram running on the CPU 211, creates TV-program information display data and outputs the created information to the HDMI unit 210. The television 101 receives the TV-program information display data via the amplifier 102 and displays an electric TV-program list which is the aforementioned list of television programs.

Figure 8A:
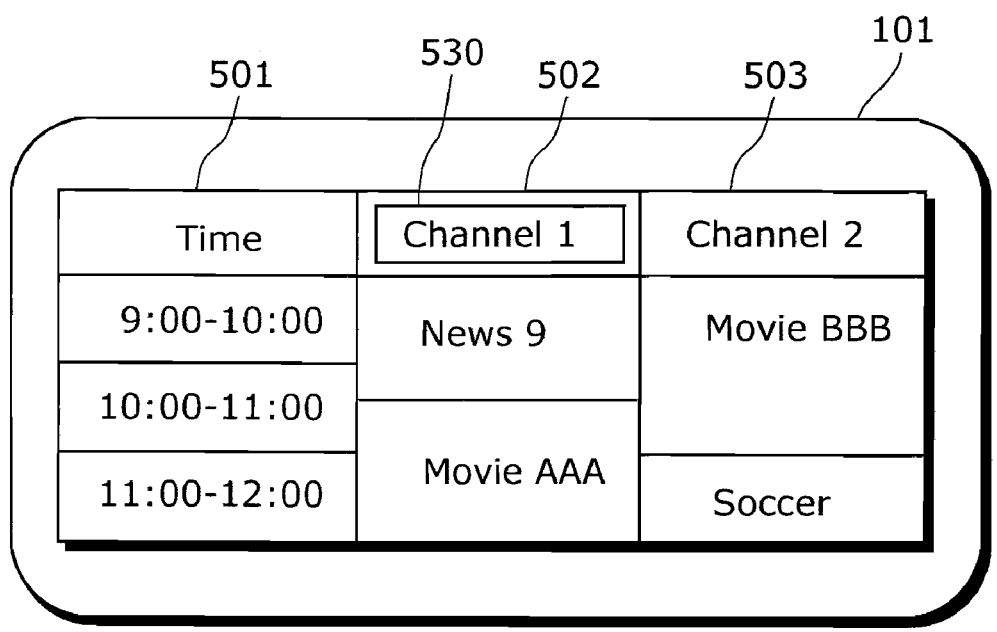
FIG. 8A is a diagram showing an example of an electric TV-program list according to the embodiment of the present invention.
Figure 8B:
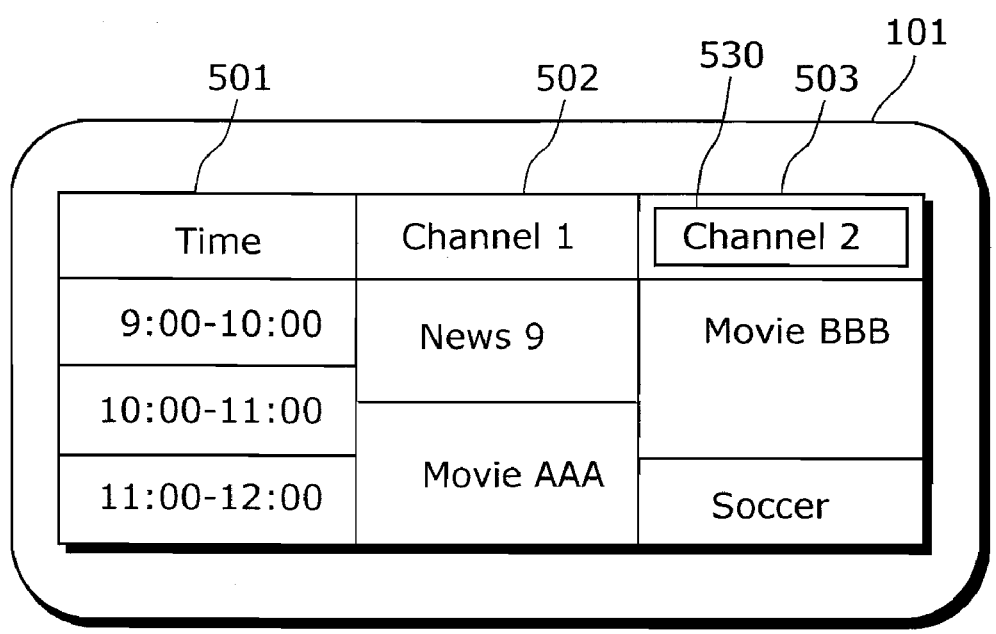
FIG. 8B is a diagram showing an example of an electric TV-program list according to the embodiment of the present invention.

FIGS. 8A and 8B are diagrams showing an example of the electric TV-program list displayed on the television 101.

As shown in FIG. 8A, the electric TV-program list is displayed on the television 101 in a grid pattern. A column 501 displays time information. A column 502 displays a channel name "Channel 1" and titles of TV-programs to be broadcast during time periods corresponding to the respective times described in the column 501. The TV-program list shows that, on "Channel 1", a TV-program "News 9" is broadcast from 9:00 to 10:30, and a TV-program "Movie AAA" is broadcast from 10:30 to 12:00. As in the case of the column 502, a column 503 displays a channel name "Channel 2" and titles of TV-programs to be broadcast during time ranges corresponding to the respective times described in the column 501. A TV-program "Movie BBB" is broadcast from 9:00 to 11:00, and a TV-program "Soccer" is broadcast from 11:00 to 12:00. The cursor 530 moves at the press of the left-cursor 303 or the right-cursor 304 on the front panel 300. When the right-cursor button 304 is pressed down in the state illustrated in FIG. 8A, a cursor 530 moves towards the right as shown in FIG. 8B. Furthermore, when the left-cursor button 303 is pressed down in the state illustrated in FIG. 8B, the cursor 530 moves towards the left as shown in FIG. 8A.

When the OK button 305 on the front panel 300 is pressed down in the state shown in FIG. 8A, the TV-program display unit 402a notifies the reproduction unit 402b of the identifier of the "Channel 1". When the OK button 305 on the front panel 300 is pressed down in the state shown in FIG. 8B, the TV-program display unit 402a notifies the reproduction unit 402b of the identifier of the "Channel 2".

Furthermore, through the demultiplex unit 205, the TV-program display unit 402a regularly stores TV-program information display data superimposed in a broadcast signal, in advance, in the second memory 203 Generally, it takes time to obtain TV-program information from the broadcast station. When the EPG button 507 of the front panel 300 is pressed, the TV-program display unit 402a can quickly display a TV-program list by reading the TV-program information display data previously stored in the second memory 203.

Figure 9:
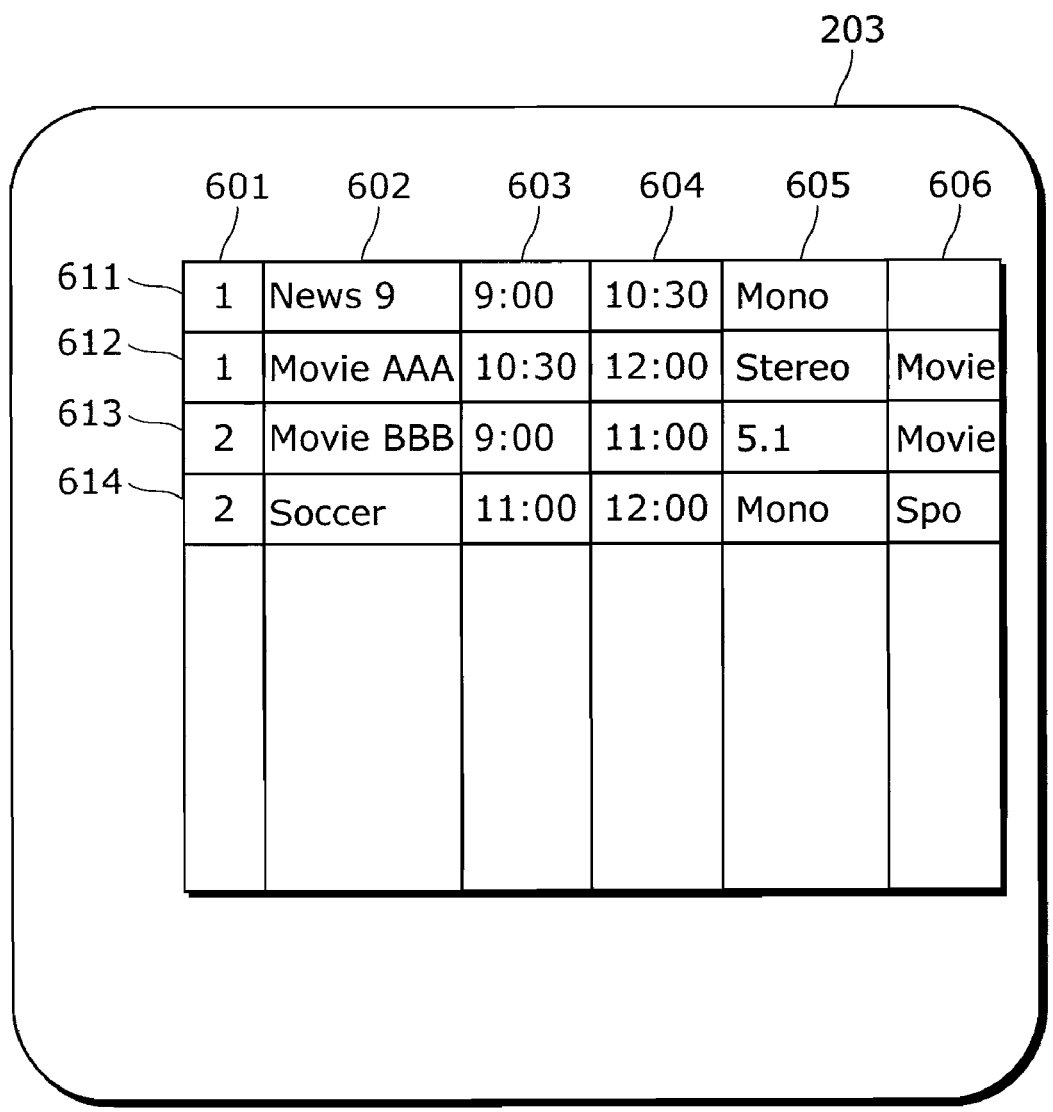
FIG. 9 is a diagram showing an example of TV-program information display data stored in a second memory according to the embodiment of the present invention.

FIG. 9 is a diagram showing an example of TV-program information display data stored in the second memory 203.

Each TV-program information included in the TV-program information display data is stored in tabular form. A column 601 describes the identifiers of channels. A column 602 describes TV-program names. A column 603 describes the broadcast start times of the TV-programs, and a column 604 describes the broadcast end times. A column 605 describes the audio type of the TV-programs, and indicates mono audio, stereo audio, and 5.1 channel audio as "mono", "stereo", and "5.1", respectively. A column 606 describes the type of the programs. The type for a regular TV-program is described as an empty cell, the type for a movie program is described as "movie", and the type for a sports program is described as "spo". Each of rows 611 to 614 describes one TV-program information. In this example, one TV-program information is the set of the channel identifier, TV-program name, broadcast start time, broadcast end time, TV-program audio type, and TV-program type. For example, the row 611 describes a set which includes "1" as the channel identifier, "news 9" as the TV-program name, "9:00" as the broadcast start time, "10:30" as the broadcast end time, "mono" as the audio type, and "regular" as the TV-program type.

The reproduction unit 402b reproduces the TV-program of a channel using the received identifier of the channel, that is, it reproduces the video and audio making up the channel. The relationship between channel identifiers and channels is pre-stored in the second memory 203 as channel information.

Figure 10:
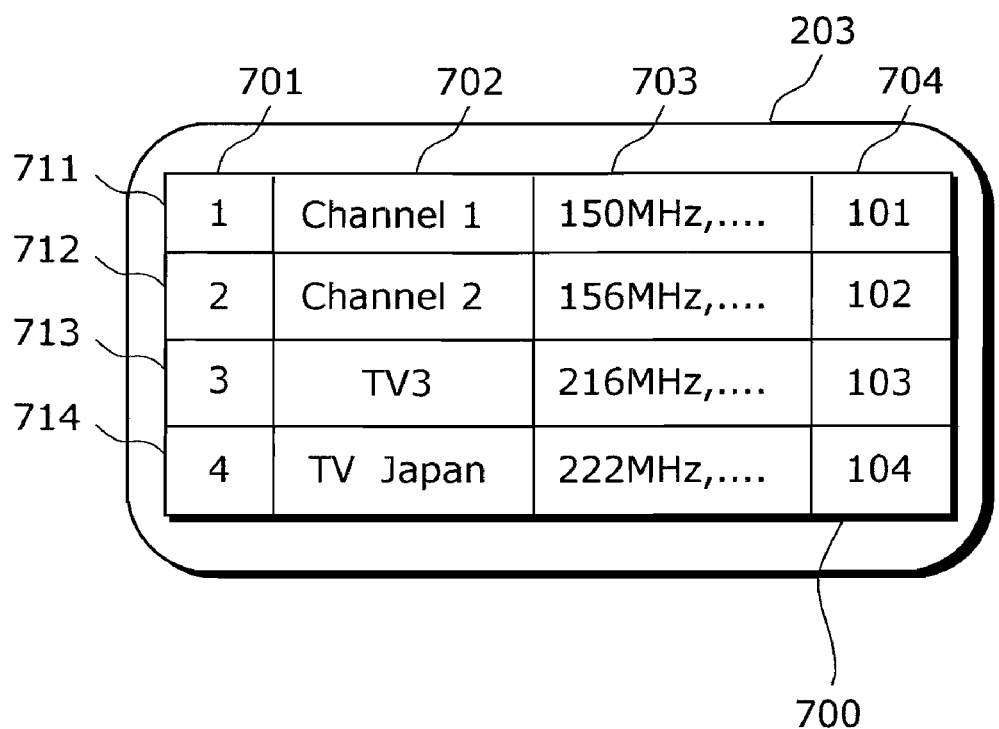
FIG. 10 is a diagram showing an example of channel information stored in a second memory according to the embodiment of the present invention.

FIG. 10 is a diagram showing an example of the channel information stored in the second memory 203.

The channel information is stored in tabular form. In other words, a channel information table 700 indicating plural channel information in tabular form is stored in the second memory 203. A column 701 describes the identifiers of channels. A column 702 describes channel names. A column 703 describes tuning information. Here, the tuning information are values to be provided to the receiving unit 204, including frequency, transmission rate, coding ratio, and so on. A column 704 describes program numbers. A program number is a number used to identify a PMT (Program Map Table) defined by the MPEG-2 standard. A description about PMT is given later. Each of rows 711 to 714 indicates a set of the identifier, channel name, tuning information, and program number of each channel. The row 711 describes a set that includes "1" as an identifier, "Channel 1" as a channel name, a frequency of "150 MHz" as tuning information, and "101" as a program number. The reproduction unit 402b passes the identifier of the received channel directly to the service manager 404 in order to reproduce the channel.

Moreover, when the user presses down the up-cursor button 301 or the down-cursor button 302 on the operating panel 300 while reproduction is taking place, the reproduction unit 402b receives a notification in response to such pressing, from the input unit 201 through the CPU 211, and changes the channel of TV-program being reproduced accordingly. In other words, when the up-cursor button 301 is pressed down by the user, the reproduction unit 402b reproduces the TV-program of a channel having the next lower channel identifier to the channel of the currently-reproduced TV-program, and when the down-cursor button 302 is pressed down by the user, the reproduction unit 402b reproduces the TV-program of a channel having the next higher channel identifier to the channel of the currently-reproduced TV-program. Then, the reproduction unit 402b stores, in the second memory 203, the channel identifier of the TV-program that is currently reproduced.

Figure 11A:
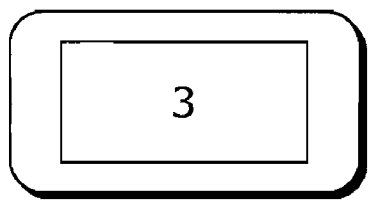
FIG. 11A is a diagram showing an example of a channel identifier stored in a second memory according to the embodiment of the present invention.
Figure 11B:
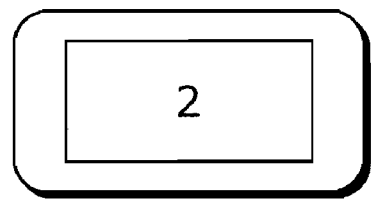
FIG. 11B is a diagram showing an example of a channel identifier stored in a second memory according to the embodiment of the present invention.
Figure 11C:
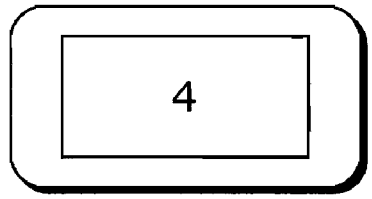
FIG. 11C is a diagram showing an example of a channel identifier stored in a second memory according to the embodiment of the present invention.

FIG. 11A, FIG. 11B, and FIG. 11C are diagrams showing an example of a channel identifier stored in the second memory 203.

As shown in FIG. 11A, in the case where an identifier "3" is stored, such channel identifier indicates that the TV-program of a channel having the channel name "TV 3" is currently being reproduced, as shown in FIG. 10. When the user presses down the up-cursor button 301 in a state illustrated in FIG. 11A, the reproduction unit 402b refers to the channel information table 700 shown in FIG. 10 and, in order to switch reproduction to the TV-program of the channel with the channel name of "Channel 2" which is the channel having a channel identifier that is one value lower than that of the currently-reproduced channel in the table, passes the channel identifier "2" of the channel name "channel 2" to the service manager 404. At the same time, the reproduction unit 402b rewrites the channel identifier stored in the second memory 203 to the channel identifier "2". FIG. 11B shows the state in which the channel identifier has been rewritten. When the user presses down the up-cursor button 302 in a state illustrated in FIG. 11A, the reproduction unit 402b refers to the channel information table 700 shown in FIG. 10 and, in order to switch reproduction to the TV-program of the channel with the channel name of "TV Japan" which is the channel having a channel identifier that is one value higher than that of the currently-reproduced channel in the table, passes the channel identifier "4" of the channel name "TV Japan" to the service manager 404. At the same time, the reproduction unit 402b rewrites the channel identifier stored in the second memory 203 to the channel identifier "4". FIG. 11C shows the state in which the channel identifier has been rewritten. The channel identifier is saved, even when power to the STB 104 is cut-off, since it is stored in the second memory 203.

In addition, upon being activated when power to the STB 104 is turned on, the reproduction unit 402b reads the channel identifier stored in the second memory 203. Then, the reproduction unit 402b passes such channel identifier to the service manager 404. With this, when power is turned on, the STB 104 is able to start the reproduction of the channel of the last TV-program that was reproduced during its previous operation.

The Java VM 403 is configured as a program execution unit, and is a Java virtual machine that sequentially analyzes and executes programs written in the Java™ language. Programs written in the Java language are compiled into intermediate codes known as byte codes which are not dependent on hardware. A Java virtual machine is an interpreter that executes such byte code. Furthermore, some Java virtual machines pass the byte code to the CPU 211 after translating the byte code into an execution format which can be interpreted by the CPU 211, and executes it. The Java VM 403 is activated, with a Java program to be executed being specified by the kernel 401a. In the present embodiment, the kernel 401a specifies the service manager 404 as the Java program to be executed. Details of the Java language are described in many publications such as "Java Language Specification (ISBN 0-201-63451-1)". Here, details thereof shall be omitted. Furthermore, the detailed operation of the Java VM itself is described in many publications such as "Java Virtual Machine Specification (ISBN 0-201-63451-X)". Here, details thereof shall be omitted.

The service manager 404, which is a Java program written in the Java language, is sequentially executed by the Java VM 403 It is possible for the service manager 404 to call or be called by another subprogram not written in the Java language, through the Java Native Interface (JNI). The JNI is also described in many publications such as in the book "Java Native Interface" and so on. Here, details thereof shall be omitted.

The service manager 404 accepts the identifier of a channel from the reproduction unit 402b, through the JNI.

The service manager 404 first passes the identifier of the channel to the Tuner 405c in the Java library 405, and requests for tuning. The Tuner 405c refers to the channel information table 700 stored in the second memory 203, and obtains the tuning information. Now, when the service manager 404 passes the channel identifier "2" to the Tuner 405c, the Tuner 405c refers to the row 712 of the channel information table 700 shown in FIG. 10, and obtains the corresponding tuning information "156 MHz". The Tuner 405c passes the tuning information to the receiving unit 204 through tuner 401b1 of the library 401b of the OS 401. The receiving unit 204 demodulates the signal transmitted from the broadcast station, based on the provided tuning information, and passes the result to the demultiplex unit 205.

Next, the service manager 404 requests the CA 405d in the Java library 405 to perform descrambling. The CA 405d provides the descrambler 206 with information required for descrambling, through the condition-release unit 401b2 of the library 401b in the OS 401. On the basis of such provided information, the descrambler 206 descrambles the signal provided by the receiving unit 204, and passes the result to the TS decoder 207.

Next, the service manager 404 provides the channel identifier to a JMF 405a in the Java library 405, and requests for the reproduction of the video and audio.

First, the JMF 405a obtains, from a PAT and a PMT, packet IDs used to specify the video and audio to be reproduced. PAT and PMT are tables stipulated by the MPEG-2 standard that show the TV-program line-up included in an MPEG-2 transport stream. PAT and PMT are embedded in the payloads of packets included in an MPEG-2 transport stream, and sent together with audio and video. PAT, which is an abbreviation of Program Association Table, is stored and sent in packets with the packet ID "0". In order to obtain the PAT, the JMF 405a specifies, to the demultiplex unit 205, the packet ID "0", through the library 401b of the OS 401. The demultiplex unit 205 performs filtering based on the packet ID "0" and, by passing the result to the CPU 211, the JMF 405a collects the PAT packets.

Figure 12:
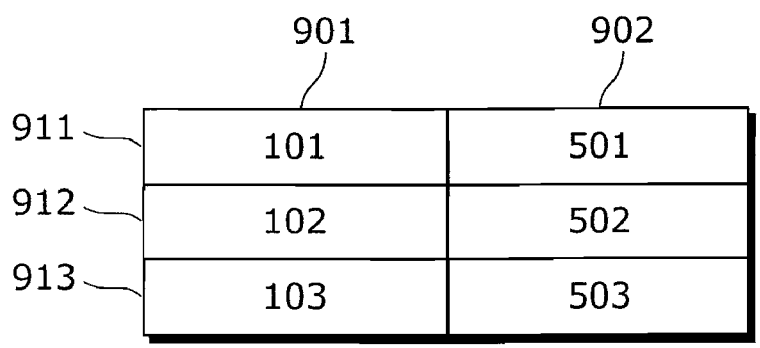
FIG. 12 is a diagram showing an example of PAT according to the embodiment of the present invention.

FIG. 12 is a chart which schematically shows an example of information of the collected PAT.

A column 901 describes program numbers. A column 902 describes packet IDs. The packet IDs shown in the column 902 are used to obtain the PMT. Each of rows 911 to 913 is a pair of the program number of a channel and a corresponding packet ID. Here, three channels are defined. The row 911 defines a pair of the program number "101" and the packet ID "501". Now, when the channel identifier provided to the JMF 405a is "2", the JMF 405a refers to the row 912 in FIG. 12, so as to obtain the corresponding program number "102", and then refers to the row 912 in the PAT shown in FIG. 12, so as to obtain the packet ID "502" corresponding to the program number "102".

PMT, which is an abbreviation of Program Map Table, is stored and transmitted in packets of the packet ID stipulated in the PAT. In order to obtain the PMT, the JMF 405a specifies the packet ID to the demultiplex unit 205 through the library 401b of the OS 401. Here, it is assumed that the packet ID specified is "502". The demultiplex unit 205 performs filtering based on the packet ID "502" and, by passing the result to the CPU 211, the JMF 405a collects the PMT packets.

Figure 13:
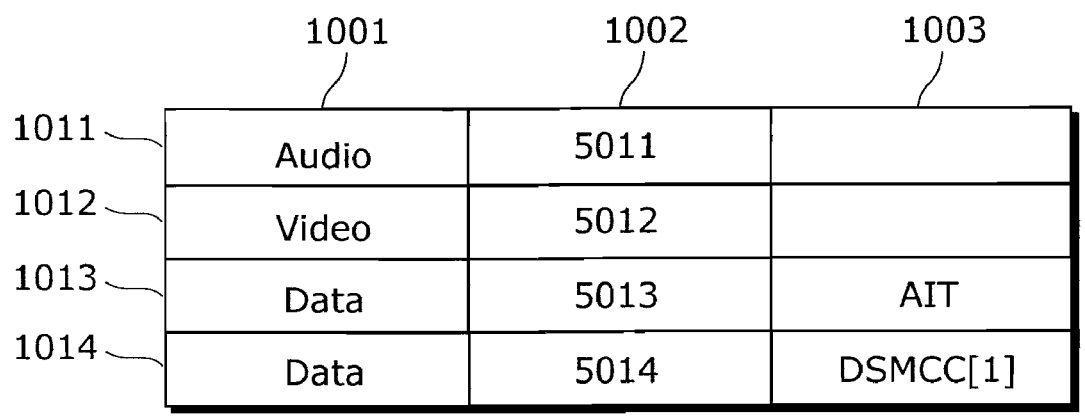
FIG. 13 is a diagram showing an example of PMT according to the embodiment of the present invention.

FIG. 13 is a chart which schematically shows an example of the collected PMT.

A column 1001 describes stream types, and a column 1002 describes packet IDs. Information specified in the respective stream types is stored and sent in the payloads of packets with the packet IDs specified in the column 1002. A column 1003 describes supplementary information. Each of rows 1011 to 1014 is a pair of a packet ID and the type of information being transmitted, which is known as an elementary stream. The column 1011, which is a pair of the stream type "audio" and the packet ID "5011", indicates that audio is stored in the payload of the packet with the packet ID "5011". The JMF 405a obtains, from the PMT, the packet IDs of the video and audio to be reproduced. Referring to the PMT shown in FIG. 13, the JMF 405a obtains the audio packet ID "5011" from the row 1011, and the video packet ID "5012" from the row 1012.

Next, the JMF 405a passes the obtained audio packet ID and video packet ID to the AV reproduction unit 401b3 of the library 401b of the OS 401. The AV reproduction unit 401b3 provides the received audio packet ID and video packet ID to the TS decoder 207. The TS decoder 207 performs filtering based on such provided packet IDs. Here, the JMF 405a passes the packet with the packet ID "5011" to the audio output unit 209, and the packet with the packet ID "5012" is passed to the video output unit 208 and the HDMI unit 210. The audio output unit 209 converts (for example, digital-analog conversion) the provided packet, as necessary, and outputs this. The video output unit 208 converts (for example, digital-analog conversion) the provided packet, as necessary, and outputs this. The HDMI unit 210 converts the packet data of the received video data and audio data, based on the HDMI specification, and outputs the converted video data and audio data.

Lastly, the service manager 404 provides the channel identifier to an AM 405b in the Java library 405, and requests for data broadcast reproduction. Here, data broadcast reproduction refers to extracting a Java program included in the MPEG-2 transport stream, and having the extracted Java program executed by the Java VM 403. As a method of encapsulating a Java program in an MPEG-2 transport stream, a method referred to as DSMCC, which is described in the MPEG Standard ISO/IEC 13818-6, is used. Here, detailed description of DSMCC shall be omitted. DSMCC defines a method of encoding the file system made up of directories and files used by a computer in the packets of an MPEG-2 transport stream. Furthermore, information about the Java program to be executed is embedded and sent in packets in the MPEG-2 transport stream in a format referred to as AIT. AIT is an abbreviation of Application Information Table defined in the 10th chapter of the DVB-MHP Standard (formally as, ETS TS 101 812 DVB-MHP Specification V1.0.2).

First, in order to obtain the AIT, the AM 405b obtains the PAT and PMT as in the case of the JMF 405a, so as to obtain the packet ID of the packet that stores the AIT. Now, when "2" is the identifier of the provided channel and the PAT shown in FIG. 12 and the PMT shown in FIG. 13 are being transmitted, the AM 405b obtains the PMT shown in FIG. 13 according to the same procedure followed by the JMF 405a. The AM 405b extracts, from the PMT, the packet ID of the elementary stream having a stream type of "Data" and which has "AIT" as supplementary information. For example, the AM 405b refers to the PMT in FIG. 13, and obtains the packet ID "5013" of the elementary stream in the row 1013.

The AM 405b provides the packet ID of the AIT to the demultiplex unit 205, through the library 401b of the OS 401. The demultiplex unit 205 performs filtering based on the provided packet ID, and passes the result to the CPU 211. As a result, the AM 405b can collect the packets of AIT.

Figure 14:
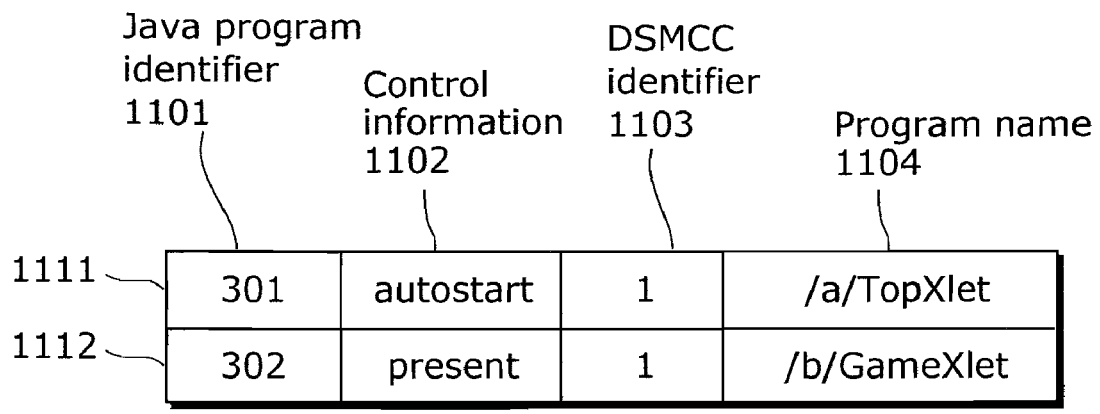
FIG. 14 is a diagram showing an example of AIT according to the embodiment of the present invention.

FIG. 14 is a chart which schematically shows an example of the collected AIT.

A column 1101 describes the identifiers of Java programs. A column 1102 describes control information of the Java programs. The control information includes "autostart", "present", "kill", and so on. "autostart" means that the STB 104 automatically executes the program immediately. "present" means that the program is not executed automatically. "kill" means that the program is to be terminated. A column 1103 describes DSMCC identifiers for extracting packet IDs including a Java program in the DSMCC format. A column 1104 describes program names of the Java programs. Each of rows 1111 and 1112 is a set of information about a Java program. The Java program defined in the row 1111 is a set of an identifier "301", control information "autostart", a DSMCC identifier "1", and a program name "a/TopXlet". The Java program defined in the row 1112 is a set of an identifier "302", control information "present", a DSMCC identifier "1", and a program name "b/GameXlet". Here, the two Java programs have the same DSMCC identifier which indicates that two Java programs are included within a single file system encoded in the DSMCC format. Here, only four items of information are stipulated for the respective Java programs, but more items of information are specified in actuality.

The AM 405b finds the "autostart" Java program from within the AIT, and extracts the corresponding DSMCC identifier and Java program name. Referring to the AIT shown in FIG. 14 for example, the AM 405b extracts the Java program in the row 1111, and obtains the DSMCC identifier "1" and the Java program name "a/TopXlet".

Next, using the DSMCC identifier obtained from the AIT, the AM 405b obtains, from the PMT, the packet ID of packets that store Java programs in the DSMCC format. More specifically, the AM 405b obtains, from within the PMT, the packet ID of the elementary stream whose stream type is "Data" and having a matching DSMCC identifier in the supplementary information.

Now, assuming that the DSMCC identifier obtained from the AIT is "1" and the PMT is that shown in FIG. 13, the AM 405b extracts the packet ID "5014" of the elementary stream in the row 1014 whose DSMCC identifier is "1".

The AM 405b specifies the packet ID of the packet in which data is embedded in the DSMC format, to the demultiplex unit 205, through the library 401b of the OS 401. Here, the AM 405b specifies the packet ID "5014". The demultiplex unit 205 performs filtering based on the provided packet ID, and passes the result to the CPU 211. As a result, the AM 405b can collect the required packets. The AM 405b reconstructs the file system from the collected packets, according to the DSMCC format, and stores this in the first memory 202 or the second memory 203. Extracting the data of a file system, and the like, and storing this in the first memory 202 or the second memory 203 shall hereafter be referred to as download.

Figure 15:
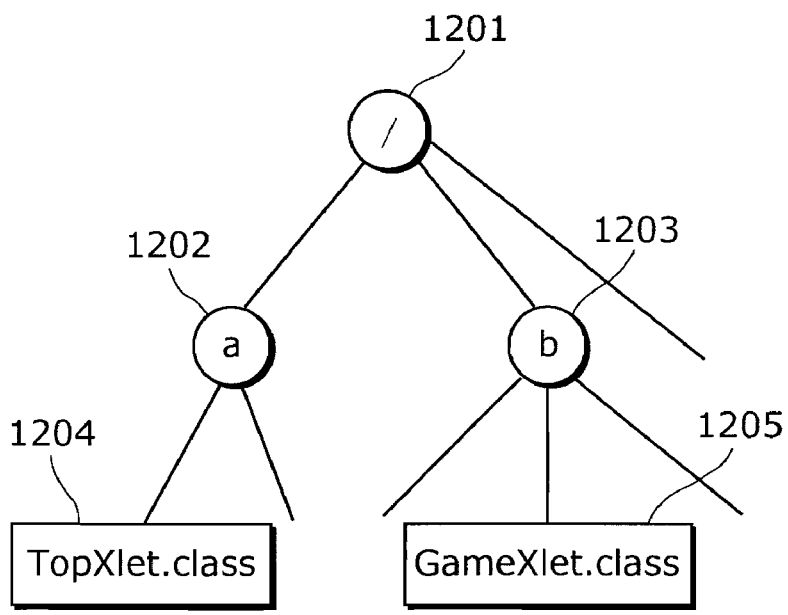
FIG. 15 is a diagram showing an example of a file system according to the embodiment of the present invention.

FIG. 15 is a diagram showing an example of a downloaded file system. Note that in FIG. 15, a circle denotes a directory and a square denotes a file This file system includes a root directory 1201, a directory 1202 indicated by "a", a directory 1203 indicated by "b", a file 1204 indicated by "TopXlet.class", and a file 1205 indicated by "gameXlet.class".

Here, although an example of downloading a file system from an MPEG2 transport stream is described, the OCAP specification also stipulates downloading using an IP network, and so on. Furthermore, a method for identifying the location of a file system using information referred to as XAIT, instead of AIT, and downloading the file system is also stipulated Next, the AM 405 passes, to the Java VM 403, the Java program to be executed from within the file system downloaded into the first memory 202 or the second memory 203. Now, when the name of the Java program to be executed is "a/TopXlet", the file "a/TopXlet.class" having ".class" added to the end of the Java program name, is the file to be executed. "/" is a division of a directory and file name. As shown in FIG. 15, the file 1204 is the Java program to be executed. Next, the AM 405b passes the file 1204 to the Java VM 403.

The Java VM 403 executes the Java program passed to it.

Upon receiving an other channel identifier, the service manager 404 stops the execution, through the respective libraries included in the Java library 405, of the video and audio currently being reproduced and Java program currently being executed likewise through the respective libraries included in the Java library 405, and performs the reproduction of video and audio and execution of a Java program based on the newly received channel identifier.

Furthermore, the service manager 404 also includes a function for receiving the channel identifier from a Java program executed on the Java VM 403, aside from the reproduction unit 402b. Specifically, the service manager 404 provides a Java language class for receiving the channel identifier, and the method thereof. Upon receiving a channel identifier, the service manager 404 stops the execution, though the respective libraries included in the Java library 405, of the video and audio currently being reproduced and Java program currently being executed likewise through the respective libraries included in the Java library 405, and subsequently performs the reproduction of new video and audio and the execution of a Java program based on the newly received channel identifier.

The Java library 405 is a collection of plural Java libraries stored in the second memory 203. In the present embodiment, the Java library 405 includes the JMF 405a, the AM 405b, the Tuner 405c, the CA 405d, the device control library 405e, a reproduction Lib 405f, an IO 405g, an AWT 405h, and so on.

Since the functions of the JMF 405a, the Tuner 405c and the CA 405d have already been described, further description shall be omitted.

The reproduction Lib 405f provides the class and method of the Java language (hereafter called Java API) for passing, to the Java program, the identifier of the channel currently being reproduced, which is stored in the second memory 203. By using this Java API, the Java program is able to recognize the channel that is currently being reproduced. Note that API refers to Application Program Interface.

The IO 405g provides, to the Java program, Java APIs for the writing of data to the second memory 203 by the Java program, or Java APIs for the reading of such written data from the second memory 203. By using this API, the Java program is able to store arbitrary data in the secondary memory 203. Since such stored data is not erased even when power to the STB 104 is turned off, the Java program can read the data again after power to the STB 104 is turned on The AWT 405h provides Java APIs for drawing or for the reception of a key input notification from the input unit 201, by the Java program. To be more specific, the AWT 405 is equivalent to the java.awt package, java.awt.event package, and other java.awt subpackages described in "The Java class Libraries Second Edition, Volume 2" (ISBN0-201-31003-1). Here, detailed description shall be omitted.

An SI 405i provides Java APIs for the obtaining of channel information and TV-program information display data by the Java program. To be more specific, there are the Java TV Specification and the like. Furthermore, the MPEG section filter API for obtaining raw binary data from an MPEG-2 transport stream currently being broadcast is defined in the OCAP Specification, and a Java application program (hereafter called Java application or application) can understand and handle unique TV-program information display data that has been transmitted.

The device control library 405e controls the HDMI unit 210 through the CEC 401b4 of the library 401b of the OS 401, and controls other devices connected to the STB 104, by using the HDMI 210 as an interface.

Figure 16:
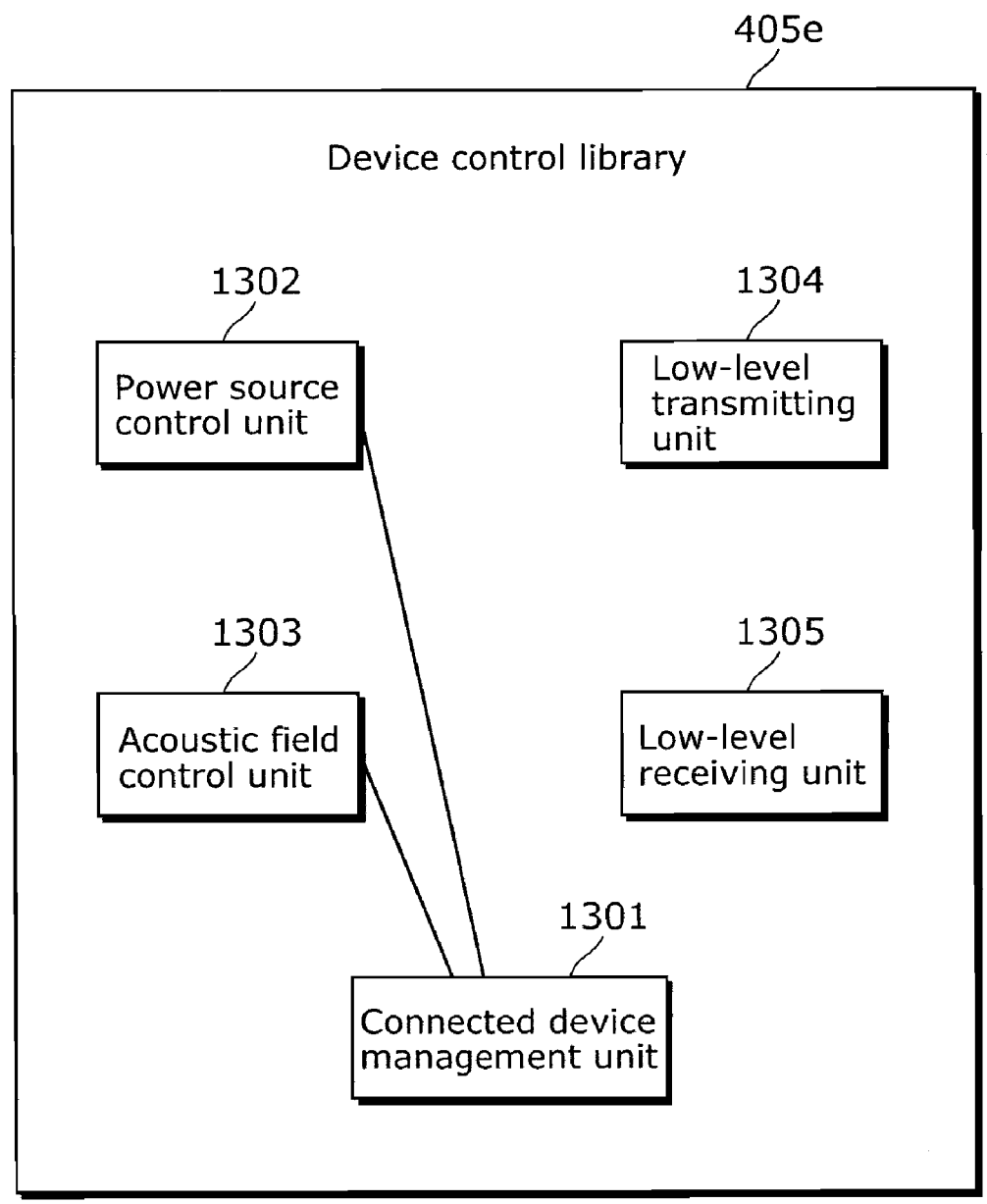
FIG. 16 is an internal configuration diagram of a device control library according to the embodiment of the present invention.

FIG. 16 is a block diagram showing an example of the internal configuration of the device control library 405e.

The device control library 405e includes a connected device management unit 1301, a power source control unit 1302, an acoustic field control unit 1303, a low-level transmitting unit 1304, and a low-level receiving unit 1305. Note that, here, the device control library 405e may include other functions such as controlling connected devices such as the amplifier 102 and the television 101 connected to the STB 104. Furthermore, in the present embodiment, a communication unit and conversion unit are configured from the device control library 405e and the CEC 401b4. In other words, the device control library 405e and the CEC 401b4 perform conversion between the data handled by the Java application and the data communicated by the CEC 401b4, so that the television 101 and the amplifier 102 can be controlled by the Java application.

The connected device management unit 1301 manages devices, such as the amplifier 102 and the television 101, which are connected by HDMI lines to the HDMI unit 210 of the STB 104. When connected to an HDMI line, an HDMI-compliant device is assigned a physical address based on the HDMI-CEC Standard. The amplifier 102 and the television 101 which are HDMI-compliant devices which are comply with HDMI-CEC, are further assigned a logical address based on the HDMI-CEC Standard. For an HDMI-CEC message, a destination is specified using this logical address. The specification is defined so that the type of a device, such as television, DVD player, and so on, can be identified through the logical address. The connected device management unit 1301 stores the physical address and logical address of an HDMI-compliant device, that is, the physical address and logical address of the amplifier 102 and the television 101, as device management information, in the first memory 202.

Figures 17, 18, 19:
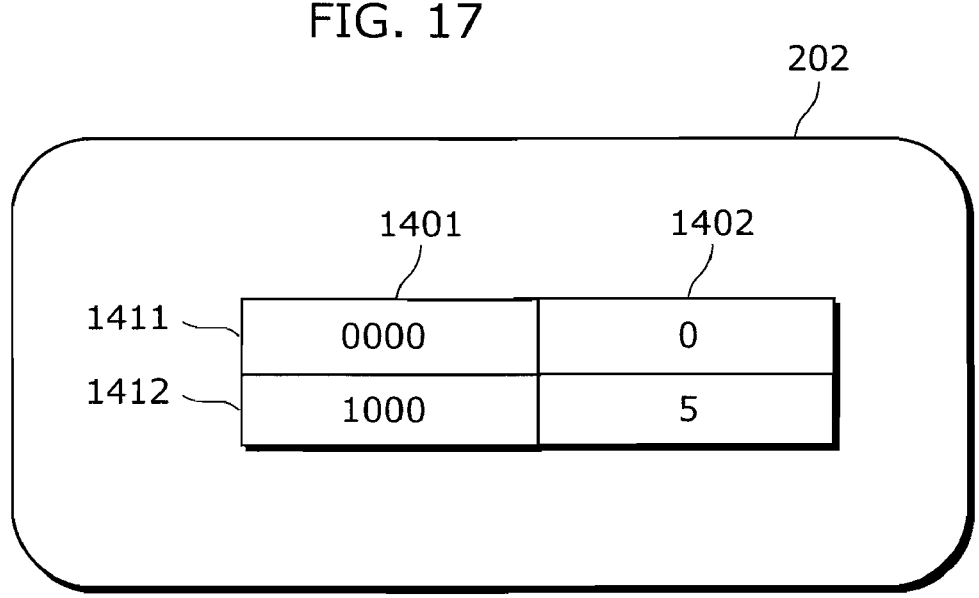
FIG. 17 is a diagram showing an example of device management information according to the embodiment of the present invention.
FIG. 18 is a diagram showing an example of Java APIs included in the connected device management unit according to the embodiment of the present invention.
FIG. 19 is a diagram showing an example of Java APIs included in the power source control unit according to the embodiment of the present invention.

FIG. 17 is a diagram showing an example of device management information stored in the first memory 202 by the connected device management unit 1301 of the STB 104, in the case where the device connection shown in FIG. 2B is performed.

The device management information has a column 1401 and a column 1402. Column 1401 indicates the physical address of connected devices, and column 1402 indicates the logical address of the connected devices. Here, two items of information corresponding to the television 101 and the amplifier 102 are stored as device management information. A row 1411 describes information for the television 101 and, in this example, indicates a physical address "0000" for the television 101 and indicates, as the logical address, "0" which describes a television based on the definition in the HDMI-CEC Standard. A row 1412 describes information for the amplifier 102 and, in this example, indicates a physical address "1000" for the amplifier 102 and indicates, as the logical address, "5" which describes an audio system based on the definition in the HDMI-CEC Standard.

The connected device management unit 1301 provides APIs (Application Program Interface) to a downloaded Java application. With this API, it is possible to search for the physical address, logical address, and state of a connected device. With this, the Java application can obtain information on connected HDMI-compliant devices.

FIG. 18 is a diagram showing an example of APIs included in the connected device management unit 1301.

A getDevices( ) method shown in (1) in FIG. 18 is a Java API which returns, in an array, HDMIDevice objects corresponding to the number of connected devices. Here, one HDMIDevice object represents one connected device. An HDMIDevice object has two methods. A getPhysicalDeviceNumber( ) method, shown in (2) in FIG. 18, which is one of the two methods, is a Java API which obtains the physical address of an HDMIDevice. A getLogicalDeviceNumber( ) method, shown in (3) in FIG. 18, which is the other of the two methods, is a Java API which obtains the logical address of an HDMIDevice.

The power source control unit 1302 transmits, to a device connected by HDMI line to the HDMI unit 210 of the STB 104, an HDMI-CEC message for turning the power source ON or OFF. To turn ON the power source, the power source control unit 1302 transmits, to a connected device, a message <UserControlPressed>["Power"] defined in the HDMI-CEC Standard. By transmitting this message, the power source of the television 101 can be turned ON. In actuality, before transmitting this command, the power source control unit 1302 checks the state of a connected device by transmitting and receiving a message. If the power is not ON, the power source control unit 413 transmits a power ON message. Furthermore, after transmitting the power source ON message, the power source control unit 1302 checks the fact that the power source of the connected device is turned on by receiving a message indicating that the power source of the connected device has been turned ON.

The power source control unit 1302 provides APIs to the downloaded Java application. Here, four examples of APIs are given.

FIG. 19 is a diagram showing an example of APIs included in the power source control unit 1302.

AllDevicePowerOn( ) shown in (1) in FIG. 19 is a Java API which turns ON the power source of all the connected devices. It returns True when successful and returns False when it fails. By calling this API, the Java application can turn ON the power source of all connected HDMI-compliant devices. As shown in FIG. 2B, when the Java application executed on the STB 104 calls this API, it is possible to turn on, at once, the power source to the two devices, namely, the television 101 and the amplifier 102.

The power source control unit 1302 refers to the connected device management unit 1301, and either transmits a message to the respective connected HDMI-compliant devices or performs a broadcast message transmission which transmits messages concurrently to all the devices.

DevicePowerON( ) shown in (2) in FIG. 19 is a Java API which turns ON the power source to a particular device. An HDMIDevice object representing a device is provided to an argument. Alternatively, information for identifying the device (the physical address, logical address, and so on, of the device) may be provided to the API. By calling this API, the power source of the identified device can be turned ON.

AllDevicePowerOff( ) shown in (3) in FIG. 19 is a Java API which turns OFF the power source of all the devices. By calling this API, the Java application can turn OFF the power source of all the connected HDMI-compliant devices.

DevicePowerOff( ) shown in (4) in FIG. 19 is a Java API which turns OFF the power source of a particular the device. An HDMIDevice object representing a device is provided to an argument. Alternatively, information for identifying the device (the physical address, logical address, and so on, of the device) may be provided to the API. By calling this API, the power source of the identified device can be turned OFF.

The acoustic field control unit 1303 transmits an HDMI-CEC message to the television 101 and the amplifier 102 so as to implement theater mode. Theater mode is a state in which the audio output of the television 101 is muted, and the audio of the STB 104 is outputted from the speaker 103 via the amplifier 102.

Figure 20:
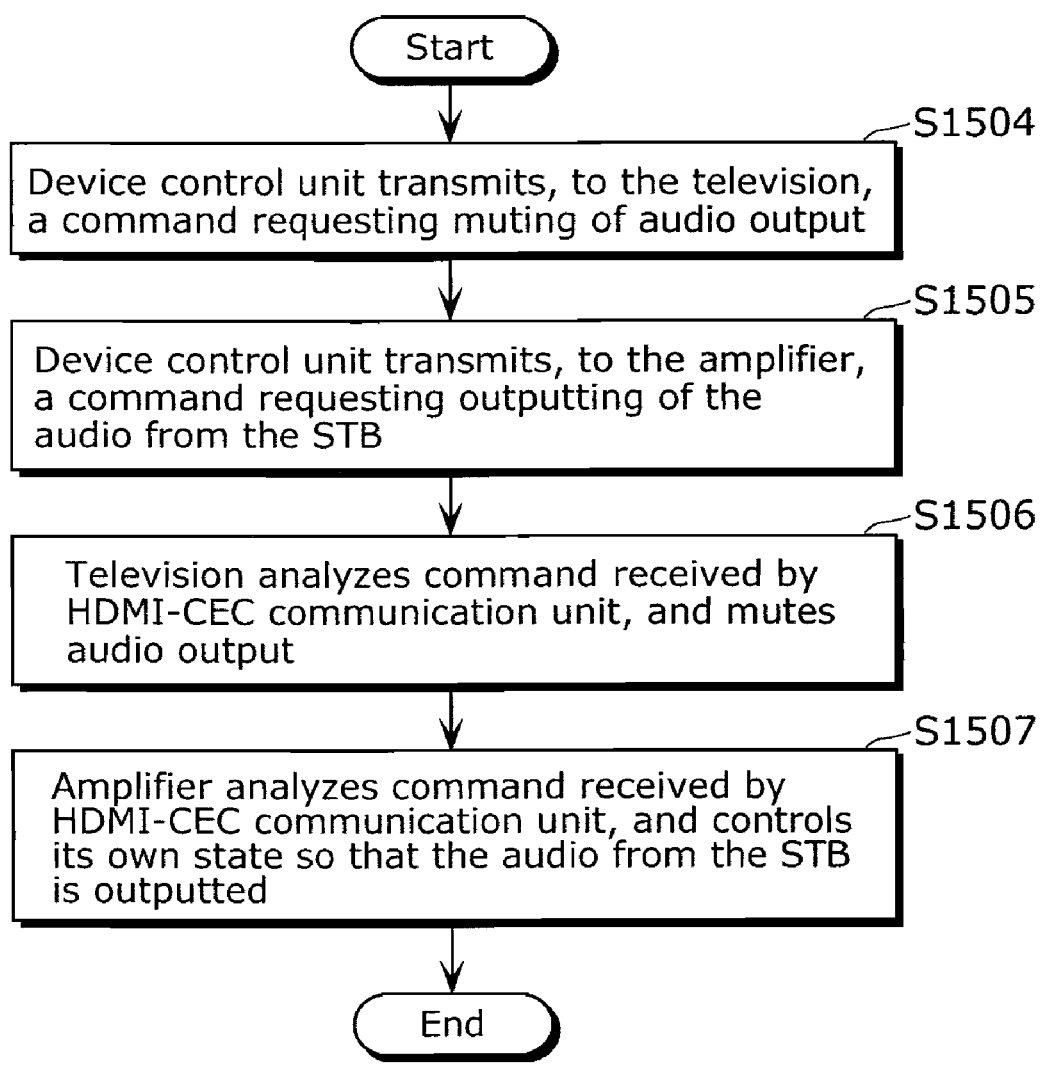
FIG. 20 is a flow chart showing the flow of the switching of the audio output state to the theater mode, by the acoustic field control unit.

FIG. 20 is a flow chart showing the flow of the switching of the audio output state to the theater mode, by the acoustic field control unit 1303.

The acoustic field control unit 1303 transmits, to the television 101, an HDMI-CEC command requesting the muting of the audio output of the television 101 (step S1504). In this case, the HDMI-CEC command is transmitted to the television 101 via the amplifier 102, and is performed in accordance with the HDMI-CEC Standard.

Furthermore, the acoustic field control unit 1303 transmits, to the amplifier 102, an HDMI-CEC command for causing the audio received from the STB 104 to be outputted to the speaker 103 (step S1505).

The television 101 receives, by the HDMI-CEC communication unit 101d, the HDMI-CEC command transmitted in step S1504, and mutes the output audio from the television 101 (step S1506).

The amplifier 102 receives, by the HDMI-CEC communication unit 102c, the HDMI-CEC command transmitted in step S1505, and outputs the audio received from the STB 104 to the speaker 103 (step S1507). Here, when the audio outputted from the STB 104 is in mono, the amplifier 102 outputs the audio in mono. When the audio is in stereo, the amplifier 102 outputs the audio in stereo, and when the audio is for the 5.1 channel, the amplifier 102 outputs the audio for the 5.1 channel. Furthermore, the amplifier 102 may also artificially change stereo audio to 5.1 channel audio and output the 5.1 channel audio, or conversely artificially change 5.1 channel audio to stereo audio and output the stereo audio.

With the process in steps S1504 to 1507 described above, the acoustic field control unit 1303 can switch the state of the audio output to the theater mode.

Furthermore, conversely, the acoustic field control unit 1303 can, with the same method as that described above, switch the audio output state so as to terminate the theater mode, terminate the output of audio from the speaker 103 by the amplifier 102, and cause audio output from the television 101.

Furthermore, the acoustic field control unit 1303 can control the audio reproduction method for the speaker 103. For example, the acoustic field control unit 1303 can set the acoustic field mode produced by the speaker 103 to an acoustic mode which best suits the content that is being viewed, such as sports mode, cinema mode, drama mode, music mode, and so on. Here, acoustic field control is, more specifically, an audio signal processing based on: a reverberation characteristic parameter such as the magnitude and quantity of reflected audio, the magnitude of reverberant audio, and reverberation time; and a frequency characteristic parameter. Acoustic field control can be implemented using conventional techniques.

The acoustic field control unit 1303 provides APIs to the downloaded Java application.

FIG. 21 is a diagram showing an example of APIs included in the acoustic field control unit 1303.

A HomeTheaterON( ) method shown in (1) of FIG. 21 is a Java API which turns ON the theater mode. By calling this API, the Java application can turn ON the theater mode, that is, terminate the audio output of the television 101 and start the audio output by the amplifier.

A HomeTheaterOFF( ) method shown in (2) of FIG. 21 is a Java API which turns OFF the theater mode. By calling this API, the Java application can turn OFF the theater mode.

A setPlayMode( ) method shown in (3) in FIG. 21 is a Java API which specifies the number of reproduction channels (reproduction mode). Upon specifying a mode corresponding to the argument, the Java application can switch the audio reproduction mode to the specified mode, for example, mono reproduction, stereo reproduction, or 5.1 channel reproduction, regardless of the audio source. For example, even when the audio source is in the 5.1 channel, stereo reproduction can be performed.

A setSoundMode( ) method shown in (4) in FIG. 21 is a Java API which sets the acoustic field mode. By providing the desired acoustic field (acoustic field mode) to the argument of this API, the Java application transmits, to the amplifier 102, an HDMI-CEC message specifying the acoustic field mode conforming to the argument. With this, the Java application can set an acoustic field mode, such as the sports mode, the cinema mode, the drama mode, the music mode, or the like, to the amplifier 102.

The low-level transmitting unit 1304 provides the downloaded Java application with APIs in order for such application to transmit HDMI-CEC messages by specifying the binary format.

FIG. 22 is a diagram showing an example of APIs included in the low-level transmitting unit 1304.

A send( ) method shown in (1) in FIG. 22 is a Java API which transmits data. When the Java application provides data in the binary format (binary data) which is a message, to the argument of this API, the low-level transmitting unit 1304 transmits the binary data. The binary data includes information such as the logical address of the transmission destination or a Broadcast transmission. The format of such binary data may be a command defined in the HDMI-CEC specification, and may be a format which includes required information based on a format of a vendor-unique command defined in the HDMI-CEC specification.

A send( ) method shown in (2) in FIG. 22 is a Java API which transmits data to a particular device. The Java application provides, to the argument of this API, the transmission message and an HDMIDevice object representing the device which is the transmission destination of the message.

The low-level receiving unit 1305 provides, to the downloaded Java application, APIs for reception of HDMI-CEC messages, in the binary format, by such application. The low-level receiving unit 1305 receives in advance, from the downloaded Java application, a listener (callback function) for delivering a received HDMI-CEC message.

FIG. 23 is a diagram showing an example of APIs included in the low-level receiving unit 1305.

An addListener( ) method shown in (1) in FIG. 23 is a Java API for accepting a listener. Upon receiving an HDMI-CEC message, the low-level receiving unit 1305 delivers the received message to a listener which is registered by the Java application.

A receive( ) method shown in (2) in FIG. 23 is a Java API for accepting a reception message defined in the listener. [0163] Here, the low-level receiving unit 1305 may also accept a specification for conditions for message delivery, simultaneously with the acceptance of the listener. For example, the low-level receiving unit 1305 accepts a specification for a physical address, a logical address, and so on, and a specification for the conditions for message delivery, and delivers, to the listener registered by the Java application, only messages matching the conditions.

An addListener method shown in (3) in FIG. 23 is a Java API for accepting conditions for message delivery and a listener. With this API, the low-level receiving unit 1305 accepts byte data representing the listener and the conditions for message delivery.

Next, an example in which the downloaded Java application controls the home theater system configured in FIG. 2b, using the device control library 405e, shall be described.

The Java application can implement various services on the STB 104, using the functions of the Java library 405 and the service manager 404. The downloaded Java application can also execute the display of the electric TV-program list shown in FIG. 8A or FIG. 8B, as a downloaded EPG application. The downloaded EPG application can obtain TV-program information display data using the S1405i, and display an electric TV-program list on the display, using the AWT 405h. Furthermore, the downloaded EPG application can accept the key input from the user and implement cursor movement on the electric TV-program list, and the like, likewise through the AWT 405h. When the user selects a TV-program on the TV-program list, the downloaded EPG application executes the changing of the channel by requesting a service selection (TV-program selection) to the service manager 404.

At the same time as the TV-program selection by the service manager 404, the downloaded EPG application can control the television 101 and the amplifier 102 and perform the activation and control of the home theater system, by using TV-program information of the downloaded TV-program and calling the device control library 405e. For example, assume that the downloaded EPG application refers to the TV-program information display data shown in FIG. 9, and reproduces the channel corresponding to row 612, according to an instruction from the user. The downloaded EPG application refers to row 612 shown in FIG. 9 and, as the type of the TV-program is movie, the downloaded EPG application first calls the power source control unit 1302 and turns on the power source of all of the connected devices.

In the present embodiment, the downloaded EPG application calls the AllDevicePowerOn( ) method shown in (1) in FIG. 19. As a result, when the power source of the television 101 and the amplifier 102 are not ON, the respective power sources are turned ON. Next, the downloaded EPG application calls the acoustic field control unit 1303 and implements the theater mode. In the present embodiment, the downloaded EPG application terminates the audio output of the television 101 and outputs the audio of the STB 104 from the speaker 103 via the amplifier 102, by calling the HomeTheaterON( ) method shown in (1) in FIG. 21. According to this series of processes by the downloaded EPG application, by the mere selection of a movie by the user, the theater mode is automatically activated and the user can view the movie in the home theater environment. In addition, since the type of the TV-program is "movie", the downloaded EPG application can call the acoustic field control unit 1303 and set the cinema mode.

In the present embodiment, the downloaded EPG application sets the cinema mode by providing a numerical value (for example 1) indicating the cinema mode, to the argument of the setSoundMode( ) method shown in (4) in FIG. 21. Furthermore, when the TV-program type is "sports", the downloaded EPG application can call the acoustic field control unit 1303 and set the sports mode. As a result, it is possible for a viewer to view the TV-program with the most suitable acoustic field.

When the user selects a news channel from the state in which the audio output state is the theater mode, the downloaded EPG application ends the theater mode. In the present embodiment, the downloaded EPG application terminates the audio output from the speaker 103 by the amplifier 102 and starts the audio output from the television 101, by calling the HomeTheaterOFF( ) method shown in (2) in FIG. 21. As a result, the viewer can view the news under normal sound reproduction.

On the other hand, when the user changes channels frequently and the audio output state is changed every time, there is a possibility of irritating the viewer. In view of this, in the present embodiment, it is also possible to let the viewer himself select the audio output state. The downloaded EPG application refers to the connected device management unit 1301 and judges whether or not both the television 101 and the amplifier 102 configuring the home theater system are connected to the STB 104. In the case where both are connected and the TV-program selected by the user is movie or sports, the downloaded EPG application displays, on the screen, a message prompting the change to the theater mode.

Figures 24, 25:
FIG. 24 is a diagram showing an example of a screen display according to the embodiment of the present invention.
FIG. 25 is a diagram showing another example of Java APIs included in the connected device management unit according to the embodiment of the present invention.

FIG. 24 is a diagram showing an example of a message, on the screen, prompting the change to the theater mode.

"Theater" is displayed on the upper right of the screen and the viewer is prompted to change to the theater mode. Here, when the viewer presses the theater mode button 308 shown in FIG. 6, the downloaded EPG application can turn ON power sources, set the theater mode, and set the acoustic field mode, as described earlier. Note that the theater button 308 can also be implemented as a graphical user interface on the screen.

Here, the connected device management unit 1301 includes a Java API for allowing the downloaded EPG application to easily judge whether or not the downloaded EPG application is connected to both the television 101 and the amplifier 102.

FIG. 25 is a diagram showing another example of an API included in the connected device management unit 1301.

An IsHomeTheater( ) method is a Java API which checks whether the television 101 and the amplifier 102 for implementing the home theater system are connected to the STB 104. This API refers to a list of connected devices, such as the device management information shown in FIG. 17, and checks whether or not the television 101 and the amplifier 102 are connected. When such an API is called, the connected device management unit 1301 returns True in the case where both the television 101 and the amplifier 102 are connected and the home theater system can be configured, and returns False when the home theater system cannot be configured. Through the inclusion of this Java API in the connected device management unit 1301, the Java application can easily judge whether or not the home theater system can be configured.

On the other hand, even when the TV-program being reproduced is a movie, there viewer may wish to listen to mono audio. Alternatively, there are cases where the viewer wishes to reproduce stereo audio in 5.1 channel reproduction. In view of this, the downloaded EPG application accepts these demands and performs setting in response to the accepted demands.

Note that in the present embodiment, power source control and acoustic field control are performed. These controls are implemented through the combination of transmitting and receiving HDMI-CEC messages by the device control library 405e. Aside from these two processes, the STB 104 in the present embodiment may perform processes such as the recording of video and audio reproduced by the STB 104, in a DVD recorder connected sing an HDMI line. In this case, the device control library 405e holds a recorder control unit, and the recorder control unit implements the desired function by combining the transmission and reception of HDMI-CEC messages.

On the other hand, when an HDMI-compliant device having a new function appears, it is possible that the device control library does not have a function for using the new function. For example, the case of the wide-spread use of the Blu-ray Disc (BD) player which is not stipulated in the logical addresses in the HDMI-CEC specification can be considered. In this case, the downloaded Java application recognizes the new HDMI-CEC message and implements a linkage with the new device thereby allowing the handling of the new device. In order for this to be implemented, the device control library 405e includes the low-level transmitting unit 1304, and the low-level receiving unit 1305. The Java application can implement linkage with the new device by using the APIs of the low-level transmitting unit 1304, and the low-level receiving unit 1305 and directly transmitting and receiving HDMI-CEC messages.

Furthermore, HDMI-CEC acknowledges the transmission and reception of unique messages in the message communication between devices which are aware of the same vendor ID. The low-level transmitting unit 1304, and the low-level receiving unit 1305 can also be used in the transmission and reception of such unique messages. When aware of the unique message from the connected device, the Java application can implement device linkage by performing transmission and reception of HDMI-CEC messages via the low-level transmitting unit 1304, and the low-level receiving unit 1305.

The operation of the device control library 405e which makes up the core of the present invention shall be described hereafter.

Figure 26:
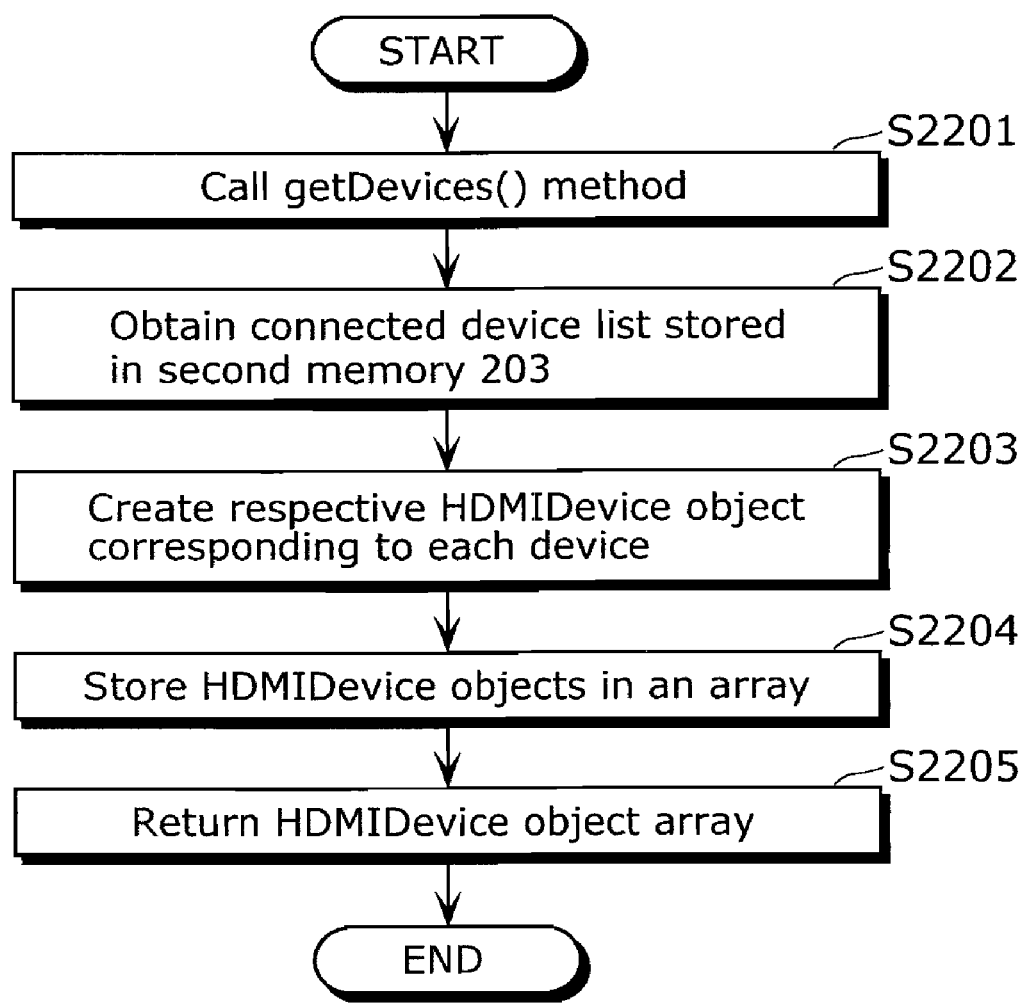
FIG. 26 is a flowchart showing an operation based on a Java API included in the connected device management unit according to the embodiment of the present invention.

FIG. 26 is a flowchart showing an operation based on the Java API included in the connected device management unit 1301, and shown in (1) in FIG. 18.

First, the Java application calls the getDevices( ) method (step S2201). The connected device management unit 1301 obtains device management information (a connected device list) stored in the first memory 202 (step S2202). Next, the connected device management unit 1301 creates an HDMIDevice object corresponding to each device indicated in the obtained connected device list (step S2203). The HDMIDevice object holds, internally, a physical address and a logical address. The connected device management unit 1301 stores the HDMIDevice objects in an array (step S2204). Finally, the connected device management unit 1301 returns the array of the HDMIDevice objects to the Java application calling the API (step S2205).

FIG. 27 is a diagram showing an example of an HDMIDevice class definition.

A physical address is stored in an internal member variable padd and a logical address is stored in an internal member variable ladd.

Figure 28:
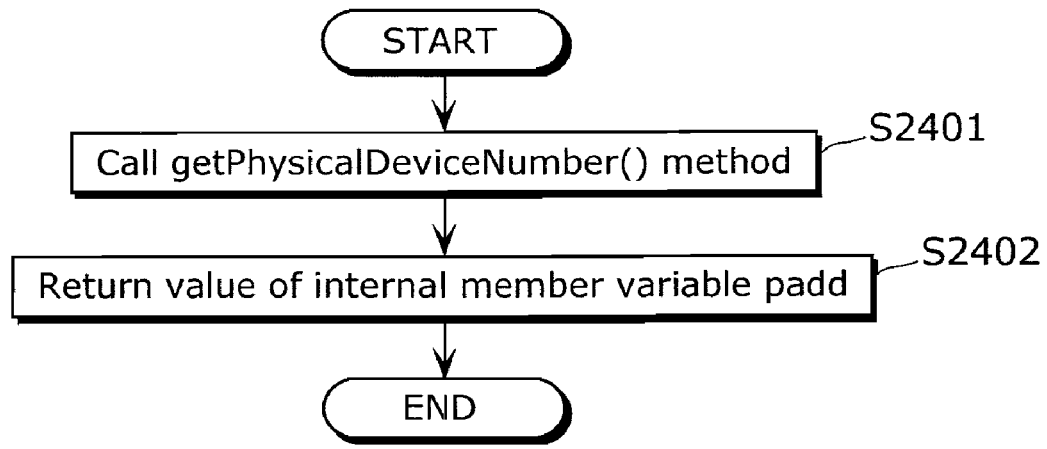
FIG. 28 is a flowchart showing an operation based on another Java API included in the connected device management unit according to the embodiment of the present invention.

FIG. 28 is a flowchart showing an operation based on the Java API included in the connected device management unit 1301, and shown in (2) in FIG. 18.

First, the Java application calls the getPhysicalDeviceNumber( ) method (step S2401). Here, assuming that the getPhysicalDeviceNumber( ) method is defined in the HDMIDevice class shown in FIG. 27, the connected device management unit 1301 returns the value stored in the internal member variable padd (step S2402). Here, in the case where the object provided with the getPhysicalDeviceNumber( ) method does not hold a physical address internally, the connected device management unit 1301 may refer to the first memory 202, retrieve a physical address, and return the retrieved physical address to the Java application.

Figure 29:
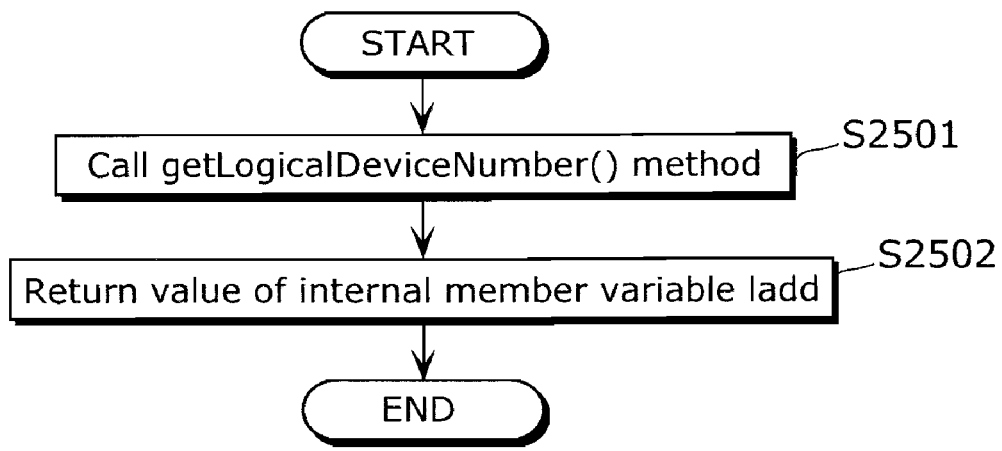
FIG. 29 is a flowchart showing an operation based on yet another Java API included in the connected device management unit.

FIG. 29 is a flowchart showing an operation based on the Java API included in the connected device management unit 1301, and shown in (3) in FIG. 18.

First, the Java application calls the getLogicalDeviceNumber( ) method (step S2501). Here, assuming that the getLogicalDeviceNumber( ) method is defined in the HDMIDevice class shown in FIG. 27, the connected device management unit 1301 returns the value stored in the internal member variable ladd (step S2502). Here, in the case where the object provided with the getLogicalDeviceNumber( ) method does not hold a logical address internally, the connected device management unit 1301 may refer to the first memory 202, retrieve a logical address, and return the retrieved logical address to the Java application.

Figure 30:
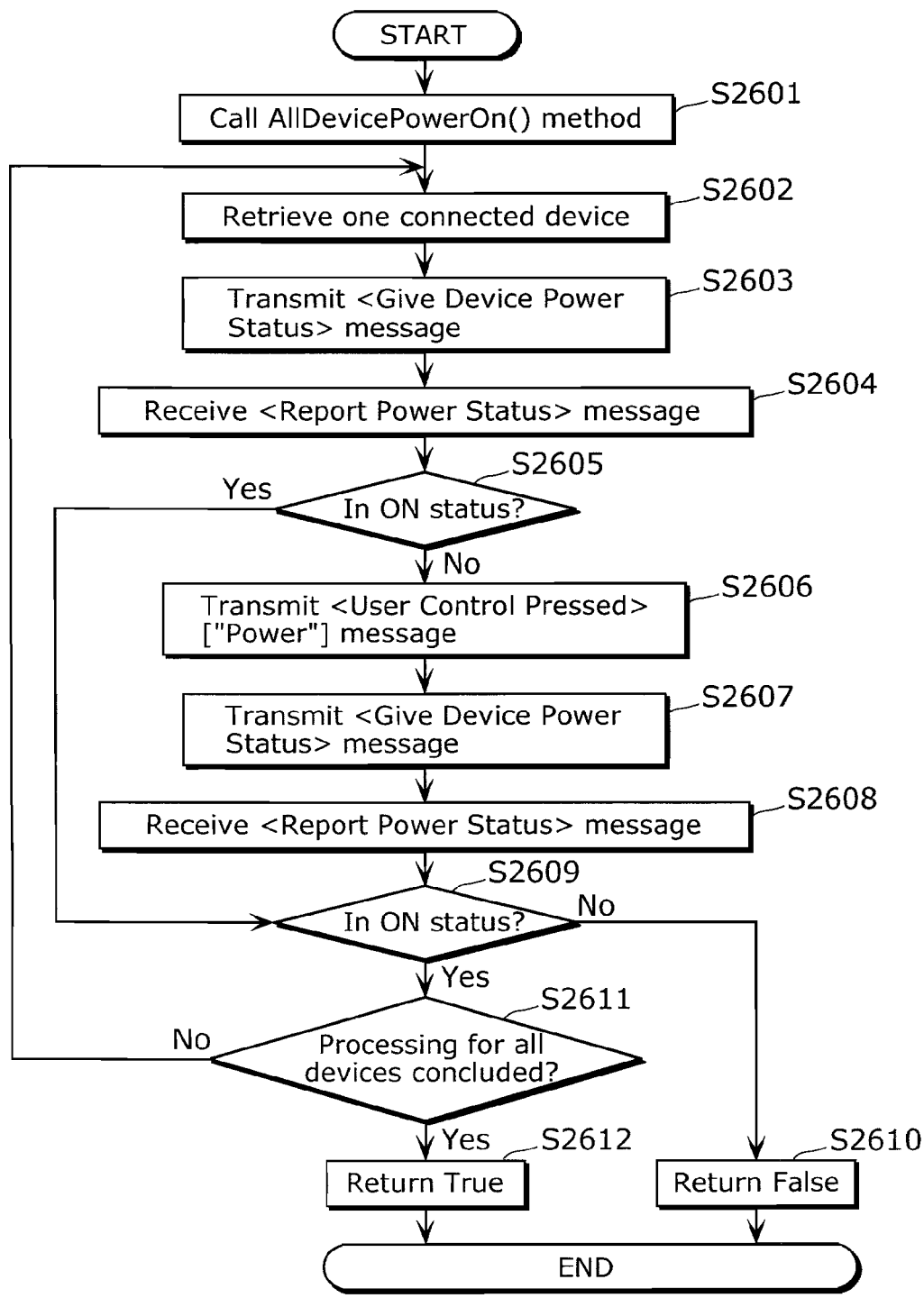
FIG. 30 is a flowchart showing an operation based on a Java API included in the power source control unit.

FIG. 30 is a flowchart showing an operation based on the Java API included in the power source control unit 1302, and shown in (1) in FIG. 19.

First, the Java application calls the AllDevicePowerOn( ) method (step S2601). The power source control unit 1302 retrieves information on one connected device, from among the device management information stored in the first memory 202 (step S2602). This information is the physical address, logical address, and so on, of a device which is required during the creation of an HDMI-CEC message. The power source control unit 1302 transmits, to such connected device, an HDMI-CEC message <Give Device Power Status> (step S2603). Next, the power source control unit 1302 receives, from the connected device to which the message was sent, an HDMI-CEC message <Report Power Status> (step S2604). The power source control unit 1302 refers to this message and checks whether or not the power source is ON (step S2605). When the power source is not ON, the power source control unit 1302 transmits an HDMI-CEC message <User Control Pressed>["Power"] to the connected device (step S2606).

Then, the power source control unit 1302 once again transmits an HDMI-CEC message <Give Device Power Status> (step S2607), and receives an HDMI-CEC message <Report Power Status> (step S2608). The power source control unit 1302 refers to this message and checks whether or not the power source is ON (step S2609). When the power source is OFF, the power source control unit 1302 returns False to the Java application as an indication of the failure of the process for turning the power source ON (step S2610), and ends all processes. The power source control unit 1302 judges, for all of the devices, whether or not the processes from step S2602 to step S2609 have ended (step S2611) and repeats the control from step S2602 when it judges that the processes have ended.

On the other hand, upon judging that the processes have ended for all the devices, the power source control unit 1302 returns True to the Java application (step S2612) and ends all processes. Here, the processes from step S2607 to step S2609 may be repeated for a predetermined number of times or for a predetermined period, until the respective power sources are turned ON.

Figure 31:
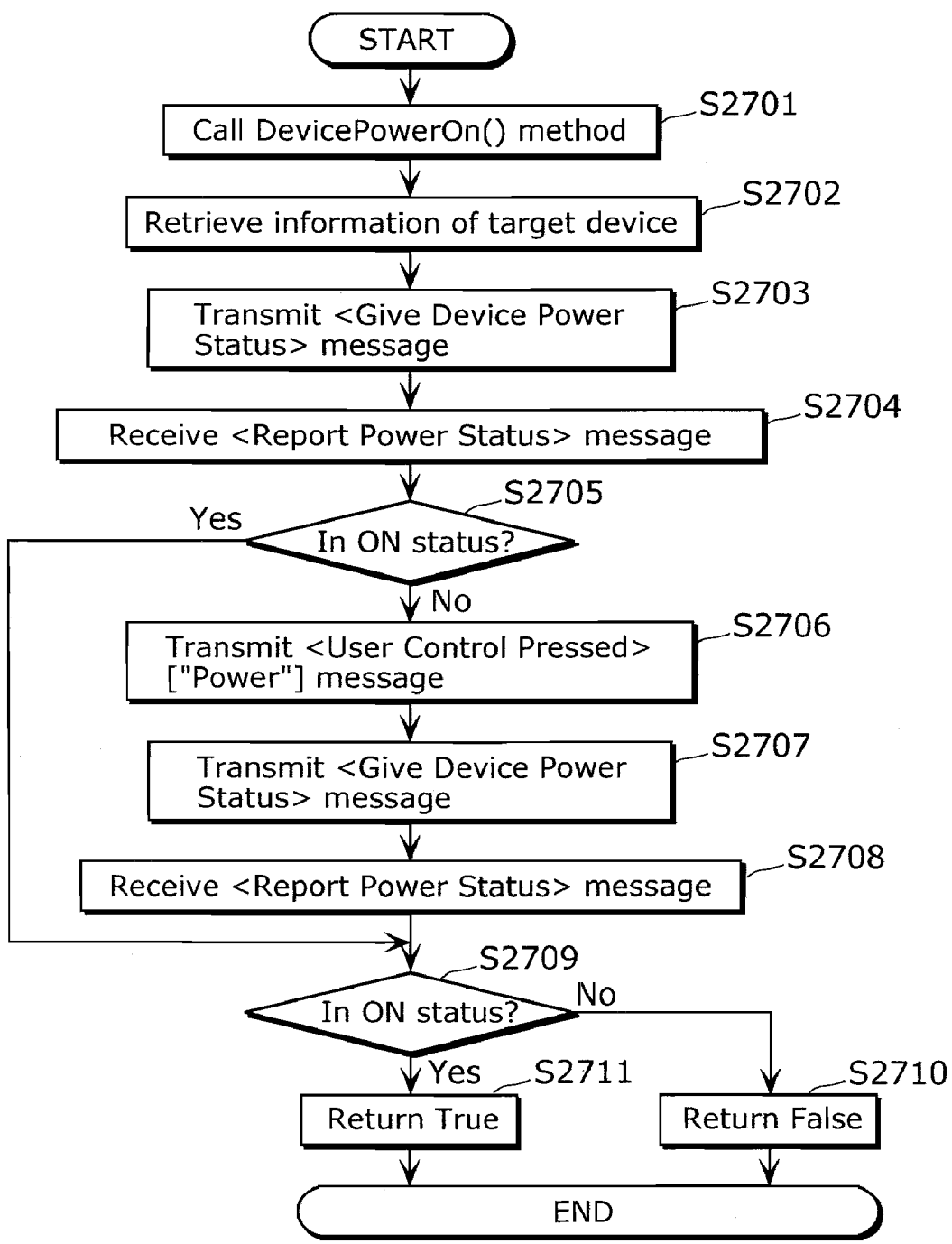
FIG. 31 is a flowchart showing an operation based on another Java API included in the power source control unit according to the embodiment of the present invention.

FIG. 31 is a flowchart showing an operation based on the Java API included in the power source control unit 1302, and shown in (2) in FIG. 19.

First, the Java application calls the DevicePowerOn( ) method (step S2701). The power source control unit 1302 retrieves information of a specified connected device, from among the device management information stored in the first memory 202 (step S2702). This information is the physical address, logical address, and so on, of a device which is required during the creation of an HDMI-CEC message. The power source control unit 1302 transmits, to such connected device, an HDMI-CEC message <Give Device Power Status> (step S2703). Next, the power source control unit 1302 receives, from the connected device to which the message was sent, an HDMI-CEC message <Report Power Status> (step S2704).

The power source control unit 1302 refers to this message and checks whether or not the power source is ON (step S2705). When the power is not ON, the power source control unit 1302 transmits an HDMI-CEC message <User Control Pressed>["Power"] to the connected device (step S2706). Then, the power source control unit 1302 once again transmits an HDMI-CEC message <Give Device Power Status> (step S2707), and receives an HDMI-CEC message <Report Power Status> (step S2708). The power source control unit 1302 refers to this message and checks whether or not the power source is ON (step S2709). When the power source is OFF, the power source control unit 1302 returns False to the Java application as an indication of the failure of the process for turning the power source ON (step S2710), and ends all processes. On the other hand, when the power source is ON, the power source control unit 1302 returns True to the Java application (step S2711), and ends all processes. Here, the processes from step S2707 to step S2709 may be repeated for a predetermined number of times or for a predetermined period, until the respective power sources are turned ON.

Figure 32:
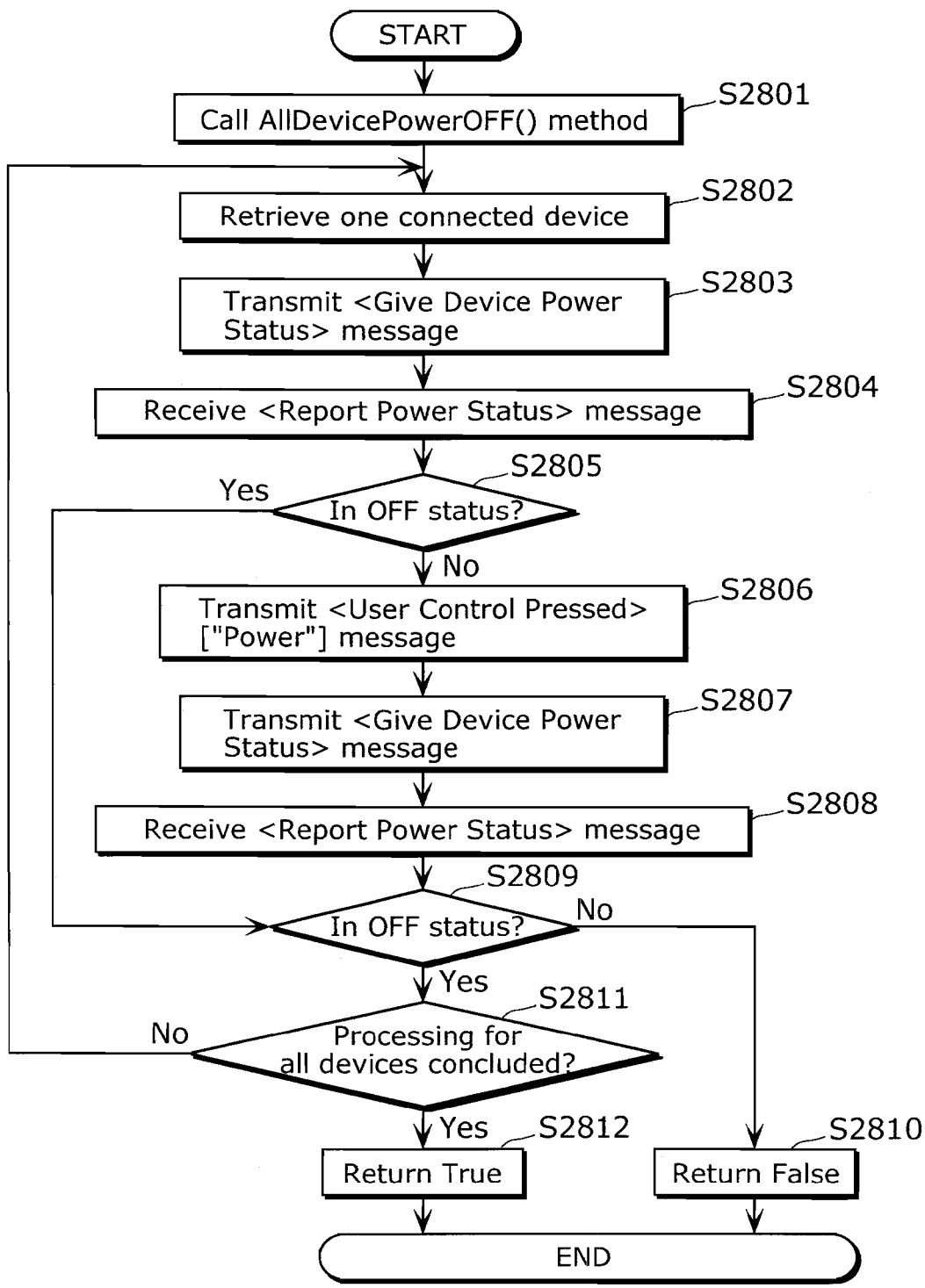
FIG. 32 is a flowchart showing an operation based on yet another Java API included in the power source control unit according to the embodiment of the present invention.

FIG. 32 is a flowchart showing an operation based on the Java API included in the power source control unit 1302, and shown in (3) in FIG. 19.

First, the Java application calls the AllDevicePowerOFF( ) method (step S2801). The power source control unit 1302 retrieves information on one connected device, from among the device management information stored in the first memory 202 (step S2802). This information is the physical address, logical address, and so on, of a device which is required during the creation of an HDMI-CEC message. The power source control unit 1302 transmits, to such connected device, an HDMI-CEC message <Give Device Power Status> (step S2803). Next, the power source control unit 1302 receives, from the connected device to which the message was sent, an HDMI-CEC message <Report Power Status> (step S2804).

The power source control unit 1302 refers to this message and checks whether or not the power source is OFF (step S2805). When the power source is ON, the power source control unit 1302 transmits an HDMI-CEC message <User Control Pressed>["Power"] to the connected device (step S2806). Then, the power source control unit 1302 once again transmits an HDMI-CEC message <Give Device Power Status> (step S2807), and receives an HDMI-CEC message <Report Power Status> (step S2808). The power source control unit 1302 refers to this message and checks whether or not the power source is OFF (step S2809). When the power source is ON, the power source control unit 1302 returns False to the Java application as an indication of the failure of the process for turning the power source OFF (step S2810), and ends all processes. The power source control unit 1302 judges, for all of the devices, whether or not the processes from step S2802 to step S2809 have ended (step S2811) and repeats the control from step S2802 when it judges that the processes have not ended. On the other hand, upon judging that the processes have ended for all the devices, the power source control unit 1302 returns True to the Java application (step S2812) and ends all processes. Here, the processes from step S2807 to step S2809 may be repeated for a predetermined number of times or for a predetermined period, until the respective power sources are turned OFF.

Figure 33:
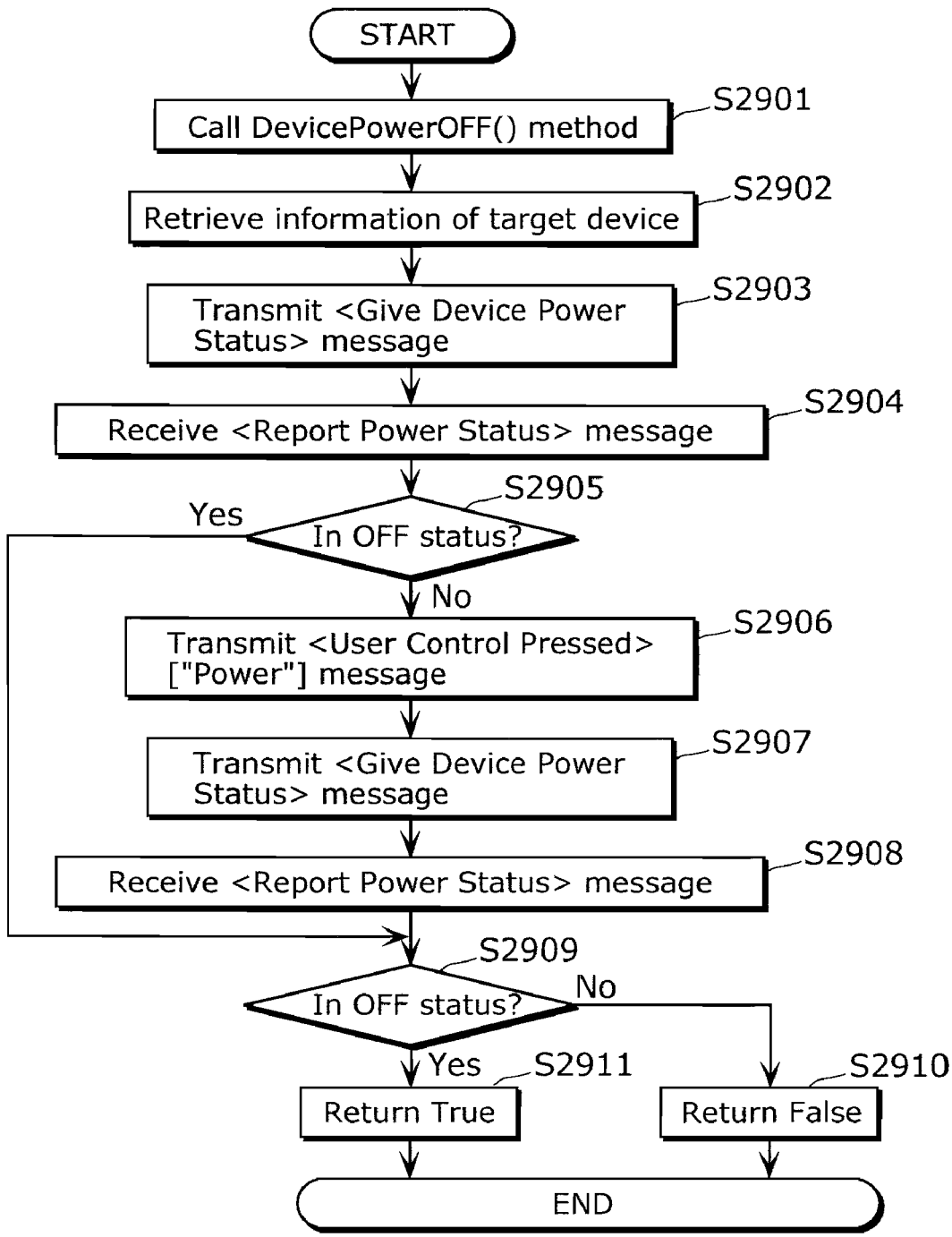
FIG. 33 is a flowchart showing an operation based on yet another Java API included in the power source control unit according to the embodiment of the present invention.

FIG. 33 is a flowchart showing an operation based on the Java API included in the power source control unit 1302, and shown in (4) in FIG. 19.

First, the Java application calls the DevicePowerOFF( ) method (step S2901). The power source control unit 1302 retrieves information of a specified connected device, from among the device management information stored in the first memory 202 (step S2902). This information is the physical address, logical address, and so on, of a device which is required during the creation of an HDMI-CEC message. The power source control unit 1302 transmits, to such connected device, an HDMI-CEC message <Give Device Power Status> (step S2903). Next, the power source control unit 1302 receives, from the connected device to which the message was sent, an HDMI-CEC message <Report Power Status> (step S2904).

The power source control unit 1302 refers to this message and checks whether or not the power source is OFF (step S2905). When the power source is ON, the power source control unit 1302 transmits an HDMI-CEC message <User Control Pressed>["Power"] to the connected device (step S2906). Then, the power source control unit 1302 once again transmits an HDMI-CEC message <Give Device Power Status> (step S2907), and receives an HDMI-CEC message <Report Power Status> (step S2908). The power source control unit 1302 refers to this message and checks whether or not the power source is OFF (step S2909). When the power source is ON, the power source control unit 1302 returns False to the Java application as an indication of the failure of the process for turning the power source OFF (step S2910), and ends all processes. On the other hand, when the power source is OFF, the power source control unit 1302 returns True to the Java application (step S2911), and ends the entire process. Here, the processes from step S2907 to step S2909 may be repeated for a predetermined number of times or for a predetermined period, until the respective power sources are turned OFF.

Figure 34:
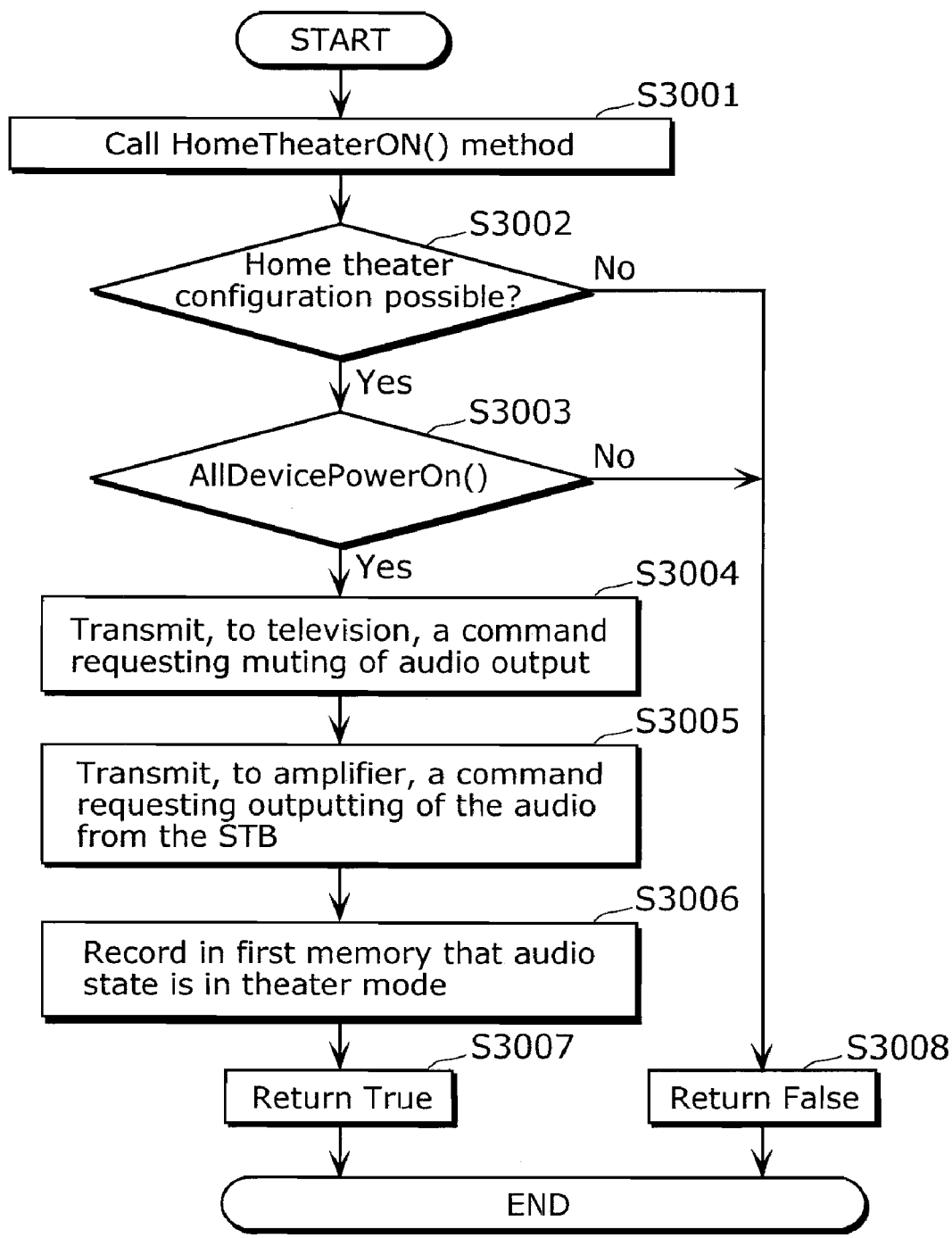
FIG. 34 is a flowchart showing an operation based on a Java API included in the acoustic field control unit according to the embodiment of the present invention.

FIG. 34 is a flowchart showing an operation based on the Java API included in the acoustic field control unit 1303, and shown in (1) in FIG. 21.

First, the Java application calls the HomeTheaterON( ) method (step S3001). The acoustic field control unit 1303 refers to the connected device management unit 1301 and checks whether or not the devices configuring the home theater system are connected (step S3002). Specific examples of devices configuring the home theater system are the television 101 and the amplifier 102. When the devices configuring the home theater system are not connected, the acoustic field control unit 1303 returns False to the Java application (step S3008) and ends the process. On the other hand, when the devices configuring the home theater system are connected, the acoustic field control unit 1303 turns ON the power source of all the connected devices by calling the AllDevicePowerOn( ) method (step S3003). Here, when the turning ON of the power source fails, the acoustic field control unit 1303 returns False to the Java application (step S3008) and ends the process. Next, the acoustic field control unit 1303 transmits, to the television 101, an HDMI-CEC message (command) requesting the muting of audio output (step S3004). Next, the acoustic field control unit 1303 sends, to the amplifier 102, an HDMI-CEC message (command) requesting the outputting of the audio from the STB 104 (step S3005). Lastly, the acoustic field control unit 1303 records, in the first memory 202, the fact that the audio output state is in the theater mode (step S3006), returns True to the Java application (step S3007), and ends the process.

Here, although the acoustic field control unit 1303 turns ON the power source of all the connected devices in step S3003, it is acceptable to turn ON the power source of only the devices configuring the home theater system. In this case, instead of judging whether or not the processes for all of the devices have ended in step S2611 in the flowchart in FIG. 30, it is judged whether or not the processes for the respective devices configuring the home theater system have ended.

Figure 35:
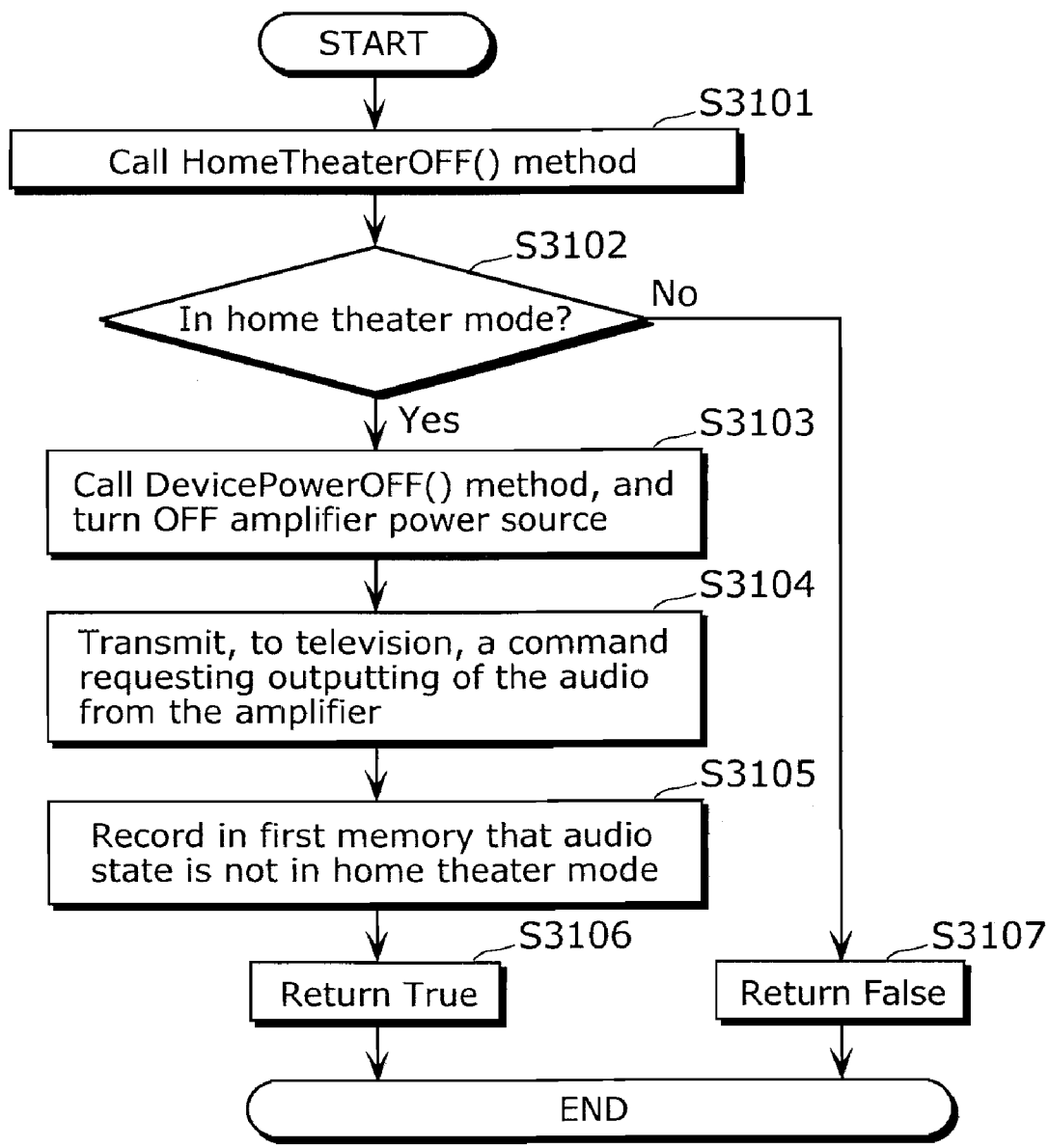
FIG. 35 is a flowchart showing an operation based on another Java API included in the acoustic field control unit according to the embodiment of the present invention.

FIG. 35 is a flowchart showing an operation based on the Java API included in the acoustic field control unit 1303, and shown in (2) in FIG. 21.

First, the Java application calls the HomeTheaterOFF( ) method (step S3101). The acoustic field control unit 1303 refers to the first memory 202 and checks whether or not the audio output state is in the theater mode (step S3102). When not in the theater mode, the acoustic field control unit 1303 returns False to the Java application (step S3107) and ends the process. On the other hand, when in the theater mode, the acoustic field control unit 1303 turns OFF the power source of the amplifier 102 by calling the DevicePowerOFF( ) method. Next, the acoustic field control unit 1303 transmits, to the television 101, an HDMI-CEC message (command) requesting the outputting of the audio from the amplifier 102 (step S3104). Lastly, the acoustic field control unit 1303 records, in the first memory 202, the fact that the audio output state is not in the theater mode (step S3105), returns True to the Java application (step S3106), and ends the process.

Figure 36:
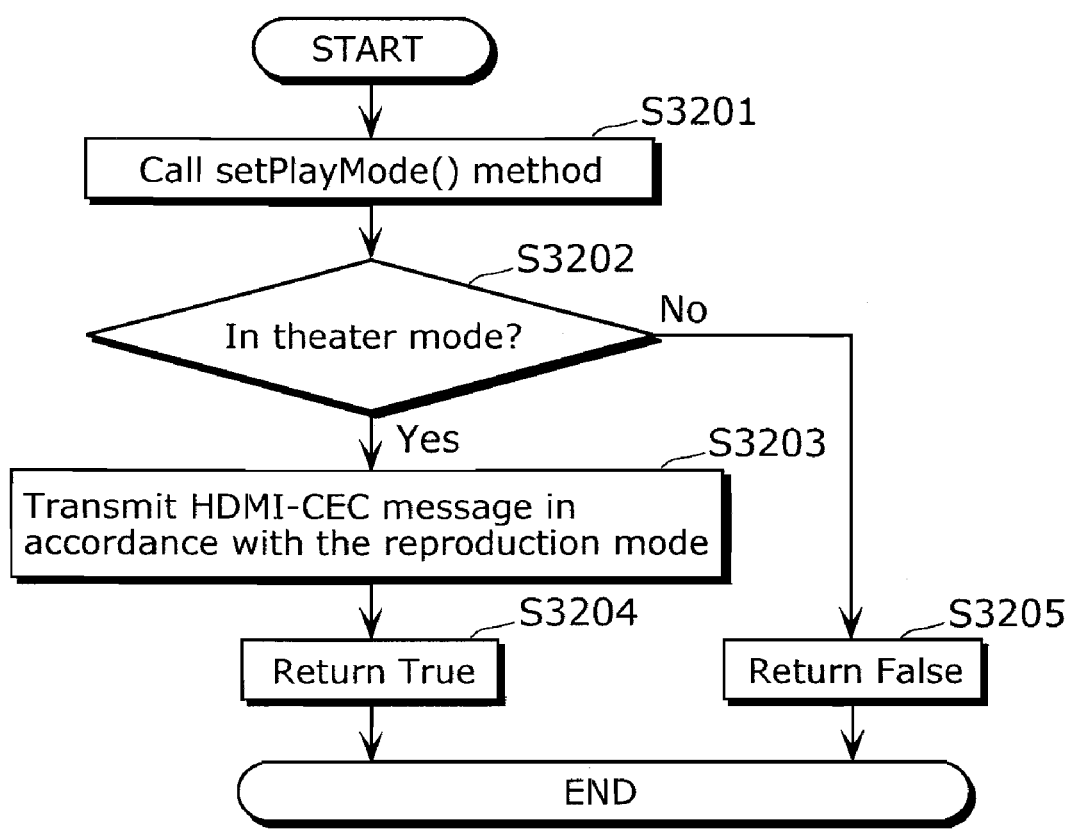
FIG. 36 is a flowchart showing an operation based on yet another Java API included in the acoustic field control unit according to the embodiment of the present invention.

FIG. 36 is a flowchart showing an operation based on the Java API included in the acoustic field control unit 1303, and shown in (3) in FIG. 21.

First, the Java application calls the SetPlayMode( ) method (step S3201). The acoustic field control unit 1303 refers to the first memory 202 and checks whether or not the audio output state is in the theater mode (step S3202). When not in the theater mode, the acoustic field control unit 1303 returns False to the Java application (step S3205) and ends the process. On the other hand, when in the theater mode, the acoustic field control unit 1303 transmits, to the amplifier 102, an HDMI-CEC message in accordance with the reproduction mode provided by the Java application (step S3203). Lastly, the acoustic field control unit 1303 returns True to the Java application (step S3204), and ends the process.

Figure 37:
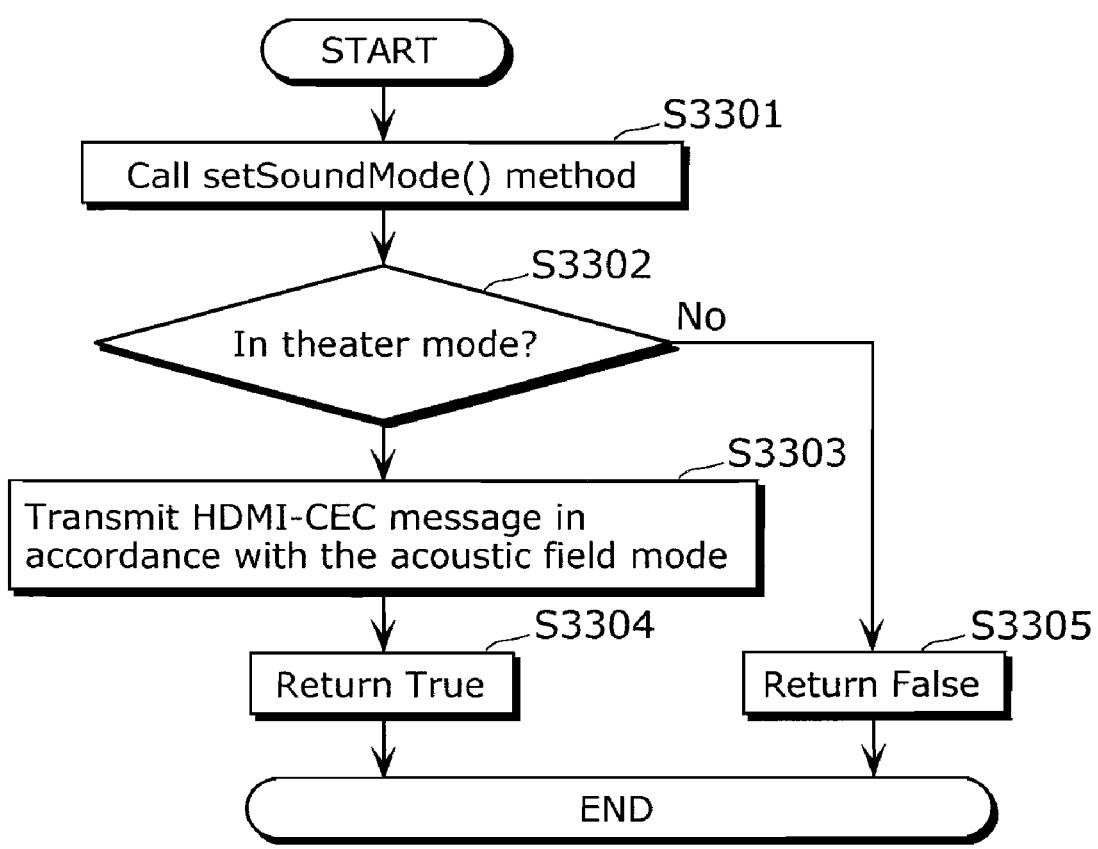
FIG. 37 is a flowchart showing an operation based on yet another Java API included in the acoustic field control unit according to the embodiment of the present invention.

FIG. 37 is a flowchart showing an operation based on the Java API included in the acoustic field control unit 1303, and shown in (4) in FIG. 21.

First, the Java application calls the SetSoundMode( ) method (step S3301). The acoustic field control unit 1303 refers to the first memory 202 and checks whether or not the audio output state is in the theater mode (step S3302). When not in the theater mode, the acoustic field control unit 1303 returns False to the Java application (step S3305), and ends the process. On the other hand, when in the theater mode, the acoustic field control unit 1303 transmits, to the amplifier 102, an HDMI-CEC message in accordance with the reproduction mode provided by the Java application (step S3303). Lastly, the acoustic field control unit 1303 returns True to the Java application (step S3304), and ends the process.

Figure 38:
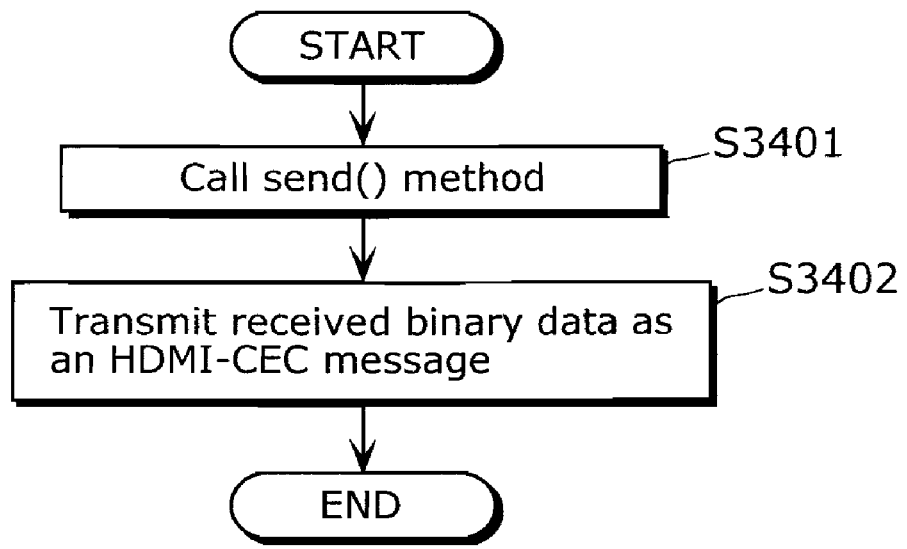
FIG. 38 is a flowchart showing an operation based on another Java API included in the low-level transmitting unit according to the embodiment of the present invention.

FIG. 38 is a flowchart showing an operation based on the Java API included in the low-level transmitting unit 1304, and shown in (1) or (2) in FIG. 22.

First, the Java application calls the send( ) method (step S3401). The low-level transmitting unit 1304 creates an HDMI-CEC message using binary data received by calling such method, and transmits the created message (step S3402)

Figure 39:
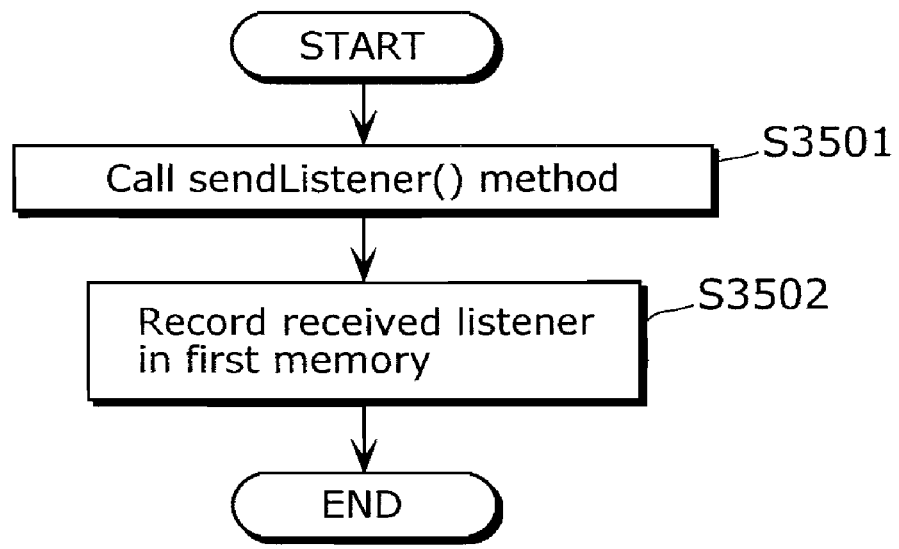
FIG. 39 is a flowchart showing an operation based on a Java API included in the low-level receiving unit according to the embodiment of the present invention.

FIG. 39 is a flowchart showing an operation based on the Java API included in the low-level receiving unit 1305, and shown in (1) or (3) in FIG. 23.

First, the Java application calls the addListener( ) method (step S3501). The low-level receiving unit 1305 records, in the first memory 202, the listener received by calling such method (step S3502).

Figure 40:
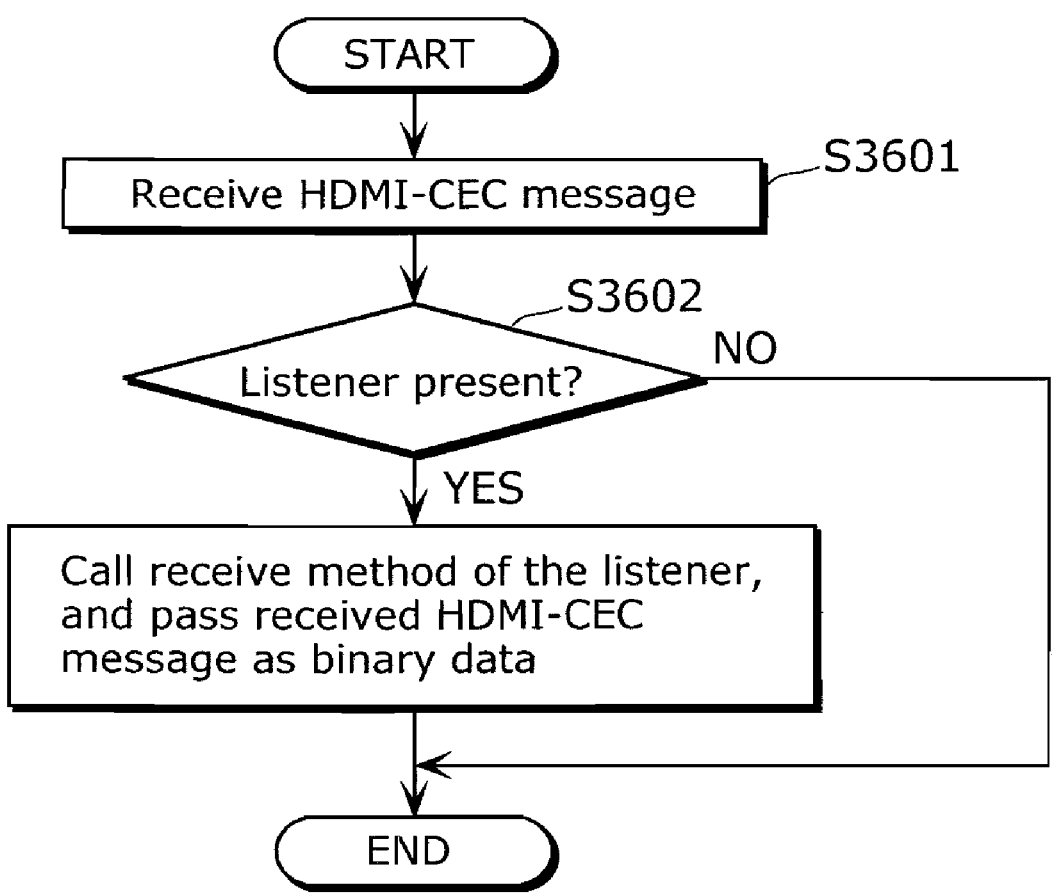
FIG. 40 is a flowchart showing the operation when the low-level receiving unit according to the embodiment of the present invention receives an HDMI-CEC message.

FIG. 40 is a flowchart showing the operation when the low-level receiving unit 1305 receives an HDMI-CEC message.

First, low-level receiving unit 1305 receives an HDMI-CEC message (step S3601). The low-level receiving unit 1305 refers to the first memory 202 and judges whether or not the listener is recorded (step S3602). Upon judging that the listener is recorded, the low-level receiving unit 1305 converts the received HDMI-CEC message into binary data and passes the converted binary data by calling a receive method of the listener.

Here, the low-level receiving unit 1305 may include a removeListener( ) method which removes a registered listener. FIG. 27 shows an example of an HDMIDevice class definition representing an HDMI-compliant device. Here, the removeListener( ) method is defined in the same manner as the setListener( ) method. When the removeListener( ) method is called, the listener stored in the first memory 202 is removed.

In this manner, in the present embodiment, when the Java application outputs control data for controlling the television 101 or the amplifier 102, that is, when the Java application calls the method of a Java API, such control data is converted into an HDMI-CEC message to be communicated by the CEC 401b4 and the HDMI unit 210 and transmitted to the television 101 or the amplifier 102. Therefore, when the television 101 or the amplifier 102 is a device which is compliant to HDMI-CEC, the Java application can call a method and freely control the television 101 or the amplifier 102, without having to take HDMI-CEC into consideration. Furthermore, since the HDMI-CEC message transmitted from the television 101 or the amplifier 102 is converted into data that can be handled by the Java application, an application program can receive a message from a device and use the message in controlling such device, without having to take HDMI-CEC into consideration. As a result, in the present invention, since respective devices can be freely controlled by the Java application, it is possible to reduce the operating load of the user and cause devices to be appropriately linked.

Note that all or a part of the constituent elements of the STB 104 shown in FIG. 5 may be configured as a semiconductor integrated circuit such as a Large Scale Integration (LSI), and the like.

The device linkage in the present invention produces the effect of being able to reduce the operating load of a user and cause devices to the appropriately linked, and can be applied, for example, to a broadcast receiver such as an STB, a mobile telephone capable of broadcast reception, a portable terminal, an in-vehicle terminal, a personal computer which receives audio and video data via the Internet, and so on.

The invention claimed is:

1. A device linkage apparatus which causes operations of devices to be linked with each other, said device linkage apparatus comprising:
a receiving unit operable to receive a broadcast signal including an application program;
a program execution unit operable to execute the application program;
a communication unit operable to perform communication between each of the devices, the communication complying with High Definition Multimedia Interface (HDMI)-Consumer Electronics Control (CEC); and
a conversion unit operable to perform conversion between data handled by the application program and data communicated by said communication unit, so as to allow control of the devices by the application program executed by said program execution unit,
wherein the devices include a first device which outputs video and audio and a second device which outputs audio,
said conversion unit is operable: to obtain, from the application program, data instructing the first device to suppress audio output and to output video, and the second device to output audio; and to convert the data into a message compliant with the HDMI-CEC, and
said communication unit is operable to send the message to the first and second devices.

2. The device linkage apparatus according to claim 1, wherein said conversion unit is operable to obtain binary data, which is the data, from the application program, and to convert the binary data into a message compliant with the HDMI-CEC, and
said communication unit is operable to transmit the message to the first and second devices among the devices.

3. The device linkage apparatus according to claim 1, wherein said communication unit is operable to receive a message compliant with the HDMI-CEC, from any one among the devices, and
said conversion unit is operable to convert the message received by said communication unit into binary data, and to pass the binary data to the application program.

4. The device linkage apparatus according to claim 3, wherein the application program is a program written in Java (registered trademark), and
said conversion unit is operable to register a listener by accepting a registration request for the listener from the application program, and to pass the binary data to the application program by calling a method of the listener.

5. The device linkage apparatus according to claim 4, wherein said conversion unit is further operable to remove the registered listener by accepting a removal request for the listener from the application program.

6. The device linkage apparatus according to claim 1, further comprising
a notification unit operable to judge whether or not the first and second devices are connected to said communication unit so as to allow communication with said communication unit, and to notify the application program of a result of the judgment.

7. The device linkage apparatus according to claim 1, wherein said conversion unit is operable: to obtain, from the application program, data instructing the second device to output audio in any one of mono, stereo, and 5.1 channel states; and to convert the data into a message compliant with the HDMI-CEC, and
said communication unit is operable to send the message to the second device.

8. The device linkage apparatus according to claim 1, wherein, when data specifying an acoustic field for the audio to be outputted by the second device is received from the application program, said conversion unit is operable to convert the data into a message compliant with the HDMI-CEC, and
said communication unit is operable to send the message to the second device.

9. The device linkage apparatus according to claim 1, wherein said conversion unit is operable
when binary data, which is the data, is obtained from the application program, to convert the binary data into a message compliant with the HDMI-CEC, and
when a message compliant with the HDMI-CEC is received by said communication unit from any one among the devices, to convert the message into binary data and to pass the binary data to the application program; and
wherein said communication unit is operable to transmit, to the first and second devices among the devices, a message created through the conversion by said conversion unit, and to receive, from any one among the devices, a message compliant with the HDMI-CEC.

10. A device linkage method for causing operations of devices to be linked with each other, said device linkage method comprising:
a receiving step of receiving a broadcast signal including an application program;
a program execution step of executing the application program;
a communication step of performing communication between each of the devices, the communication complying with High Definition Multimedia Interface (HDMI)-Consumer Electronics Control (CEC); and
a conversion step of performing conversion between data handled by the application program and data communicated in said communication step, so as to allow control of the devices by the application program executed in said program execution step,
wherein the devices include a first device which outputs video and audio and a second device which outputs audio,
in said conversion step, data instructing the first device to suppress audio output and to output video, and the second device to output audio is obtained, from the application program; and the data is converted into a message compliant with the HDMI-CEC, and
in said communication step, the message is sent to the first and second devices.

11. A non-transitory computer-readable recording medium containing a program for causing operations of devices to be linked with each other, said program causing a computer to execute:
a receiving step of receiving a broadcast signal including an application program;
a program execution step of executing the application program;
a communication step of performing communication between each of the devices, the communication complying with High Definition Multimedia Interface (HDMI)-Consumer Electronics Control (CEC); and
a conversion step of performing conversion between data handled by the application program and data communicated in said communication step, so as to allow control of the devices by the application program executed in said program execution step, wherein the devices include a first device which outputs video and audio and a second device which outputs audio, in said conversion step, data instructing the first device to suppress audio output and to output video, and the second device to output audio is obtained, from the application program; and the data is converted into a message compliant with the HDMI-CEC, and in said communication step, the message is sent to the first and second devices.

12. An integrated circuit which causes operations of devices to be linked with each other, said integrated circuit comprising:

a receiving unit operable to receive a broadcast signal including an application program;

a program execution unit operable to execute the application program;

a communication unit operable to perform communication between each of the devices, the communication complying with High Definition Multimedia Interface (HDMI)-Consumer Electronics Control (CEC); and a conversion unit operable to perform conversion between data handled by the application program and data communicated by said communication unit, so as to allow control of the devices by the application program executed by said program execution unit, wherein the devices include a first device which outputs video and audio and a second device which outputs audio, said conversion unit is operable: to obtain, from the application program, data instructing the first device to suppress audio output and to output video, and the second device to output audio; and to convert the data into a message compliant with the HDMI-CEC, and said communication unit is operable to send the message to the first and second devices.

* * * * *